United States Patent
Lee et al.

(10) Patent No.: US 8,566,405 B2
(45) Date of Patent: Oct. 22, 2013

(54) METHOD AND SYSTEM FOR CONTROLLING SESSION FOR INTERWORKING IN CONVERGED IP MESSAGING SERVICE

(75) Inventors: Seung-Yong Lee, Seoul (KR); Kyung-Tak Lee, Yongin-si (KR); Sung-Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 232 days.

(21) Appl. No.: 12/627,856

(22) Filed: Nov. 30, 2009

(65) Prior Publication Data

US 2010/0138484 A1 Jun. 3, 2010

(30) Foreign Application Priority Data

| Nov. 28, 2008 | (KR) | 10-2008-0120164 |
| Dec. 1, 2008 | (KR) | 10-2008-0120688 |
| Feb. 2, 2009 | (KR) | 10-2009-0008186 |
| Jun. 22, 2009 | (KR) | 10-2009-0055705 |

(51) Int. Cl.
G06F 15/16 (2006.01)

(52) U.S. Cl.
USPC .......................... 709/206; 370/260; 370/466

(58) Field of Classification Search
USPC .......................................................... 709/203
See application file for complete search history.

(56) References Cited

U.S. PATENT DOCUMENTS

| 8,060,621 B2 * | 11/2011 | Lee et al. ..................... 709/227 |
| 2006/0256748 A1 | 11/2006 | Jung et al. |
| 2008/0114881 A1 * | 5/2008 | Lee et al. ..................... 709/227 |
| 2008/0123686 A1 * | 5/2008 | Lee et al. ..................... 370/466 |
| 2008/0170563 A1 * | 7/2008 | Zhu et al. ..................... 370/352 |
| 2008/0219241 A1 | 9/2008 | Leinonen et al. |
| 2008/0274739 A1 * | 11/2008 | Wu ........................... 455/435.1 |
| 2008/0281971 A1 * | 11/2008 | Leppanen et al. ............ 709/228 |
| 2008/0294783 A1 * | 11/2008 | Shen et al. .................... 709/228 |
| 2009/0047985 A1 * | 2/2009 | Wang .......................... 455/518 |

(Continued)

FOREIGN PATENT DOCUMENTS

| JP | 2008-519520 | 6/2008 |
| WO | WO 2007/051489 | 5/2007 |
| WO | WO 2008/053075 | 5/2008 |
| WO | WO 2008/060085 | 5/2008 |

OTHER PUBLICATIONS

OMA, "OMA Converged IP Messaging System Description", Draft Version 1.0, Open Mobile Alliance, OMA-TS-CPM_System_Description-V1_0-20081120-D, Nov. 20, 2008.

(Continued)

*Primary Examiner* — Hamza Algibhah
(74) *Attorney, Agent, or Firm* — The Farrell Law Firm, P.C.

(57) ABSTRACT

Disclosed is a session control method in a Converged Internet Protocol (IP) Messaging (CPM) server for supporting a CPM session between a first client subscribing to a CPM service and a second client not subscribing to the CPM service, the session control method includes, after the CPM session is initiated between the first and second clients through the CPM server and an Interworking Function (IWF), receiving a session modification request message including specific media from the first client; sending the session modification request message including the specific media to the IWF through the initiated CPM session; and receiving a response message from the IWF, the response message including a reason for a rejection of the session modification request message including the specific media.

10 Claims, 24 Drawing Sheets

(56) References Cited

U.S. PATENT DOCUMENTS

| | | | |
|---|---|---|---|
| 2009/0150562 A1* | 6/2009 | Kim et al. | 709/238 |
| 2009/0279455 A1* | 11/2009 | Wang et al. | 370/260 |
| 2009/0286516 A1* | 11/2009 | Sedlacek et al. | 455/414.1 |
| 2011/0103265 A1* | 5/2011 | Dilipkumar Saklikar et al. | 370/259 |
| 2013/0072190 A1 | 3/2013 | Pitkamaki | |

OTHER PUBLICATIONS

OMA, "Converged IP Messaging Architecture", Draft Version 1.0, Open Mobile Alliance, OMA-AD-CPM-V1_0-20081120-D, Nov. 20, 2008.

* cited by examiner

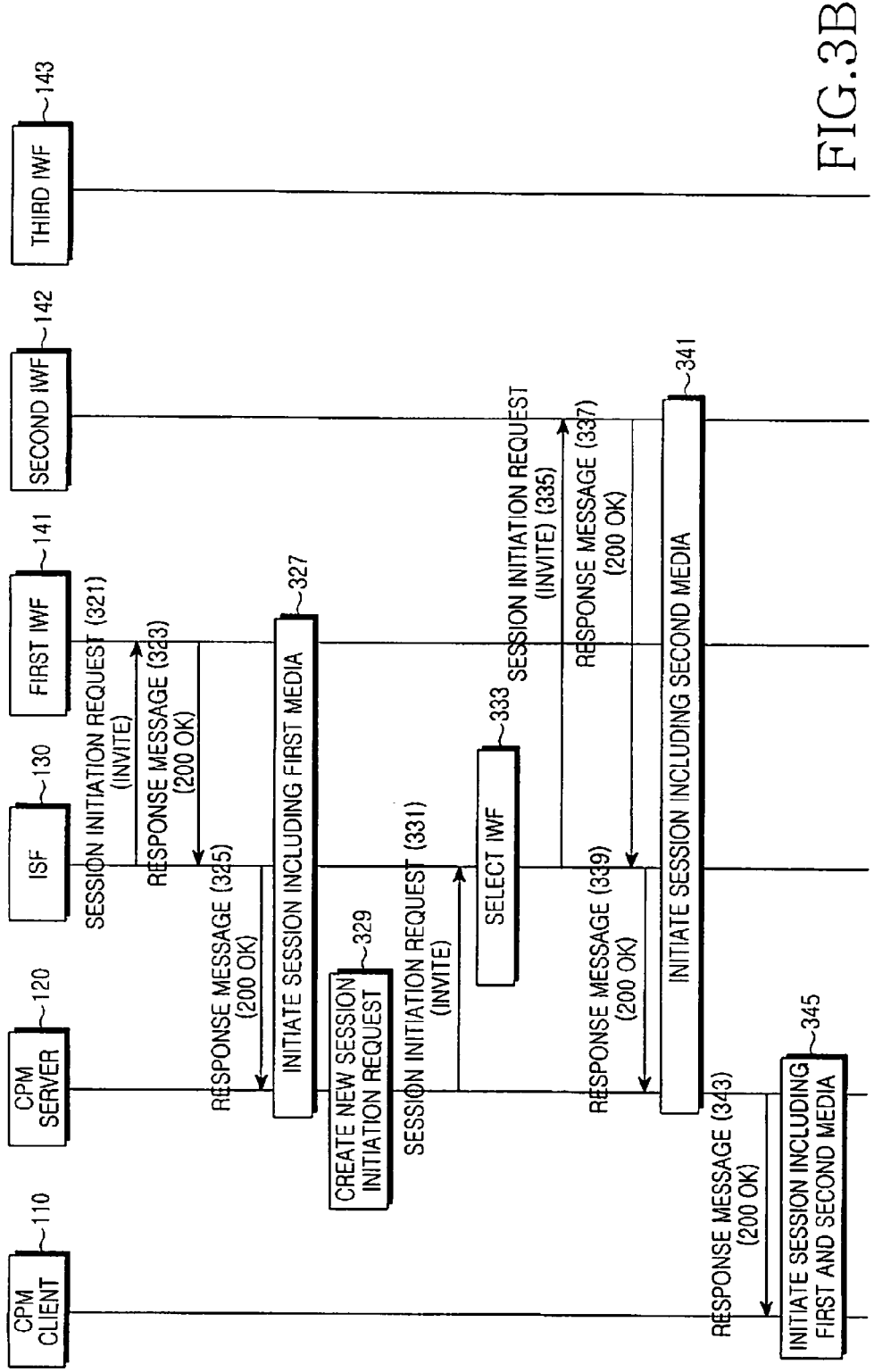

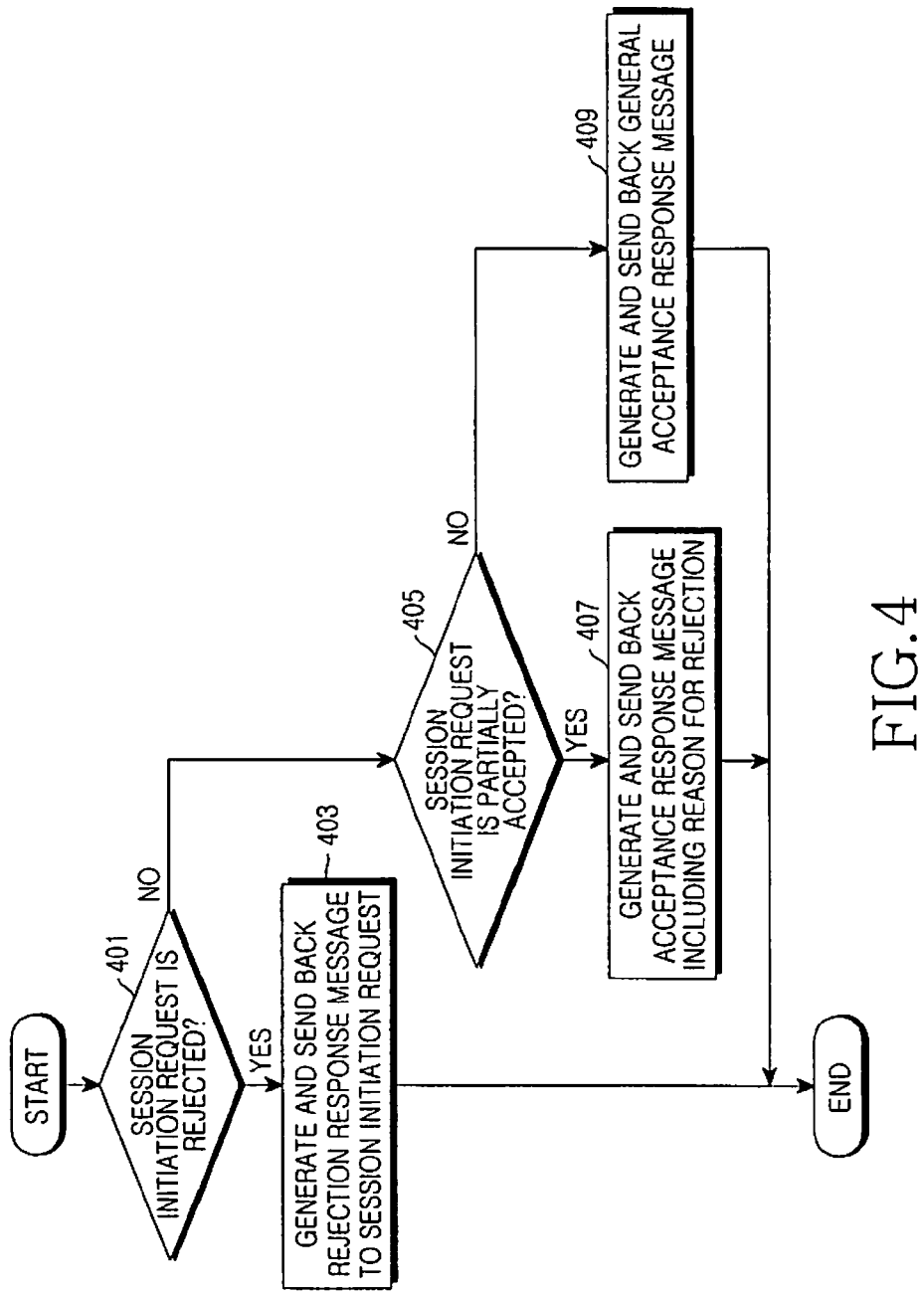

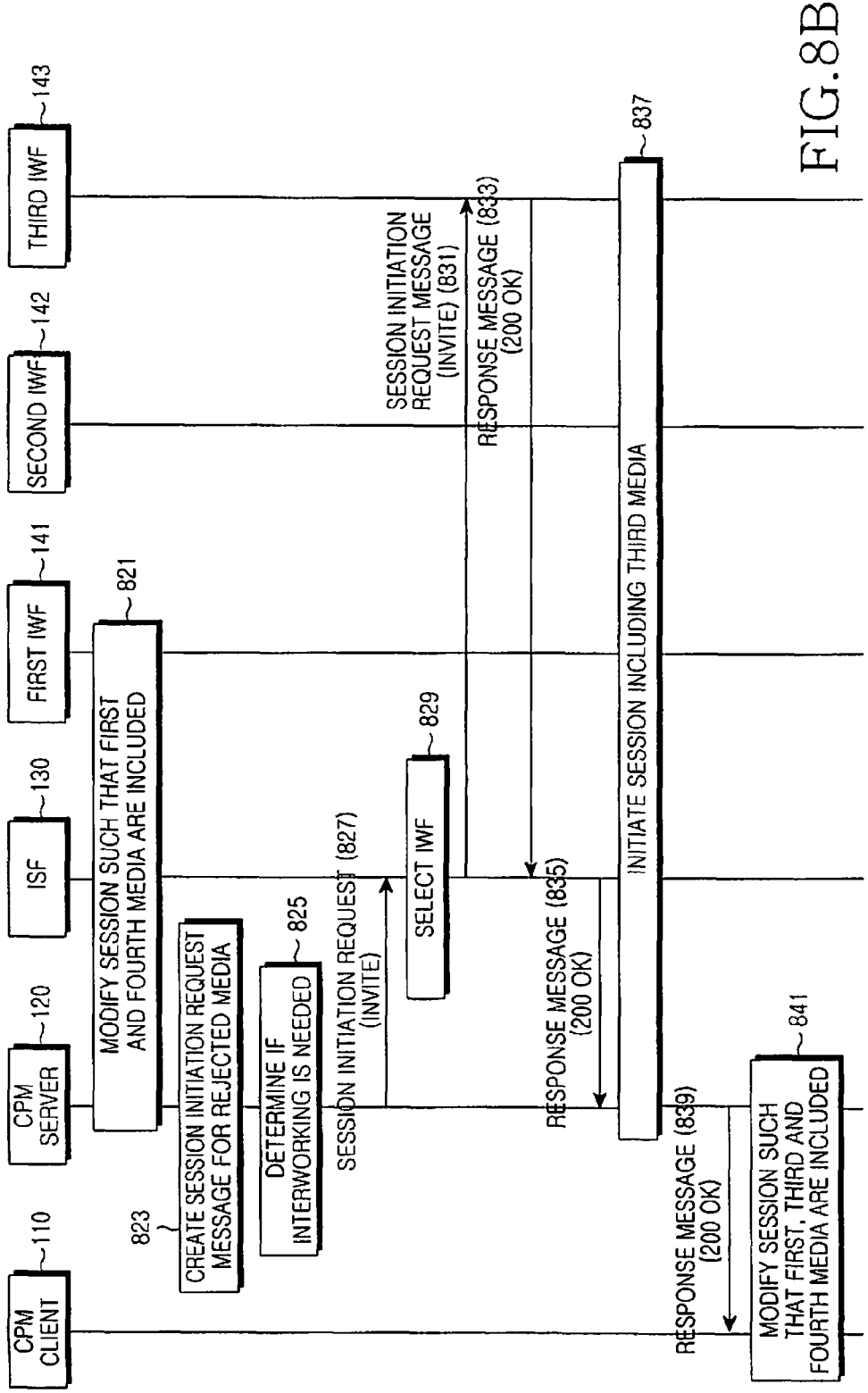

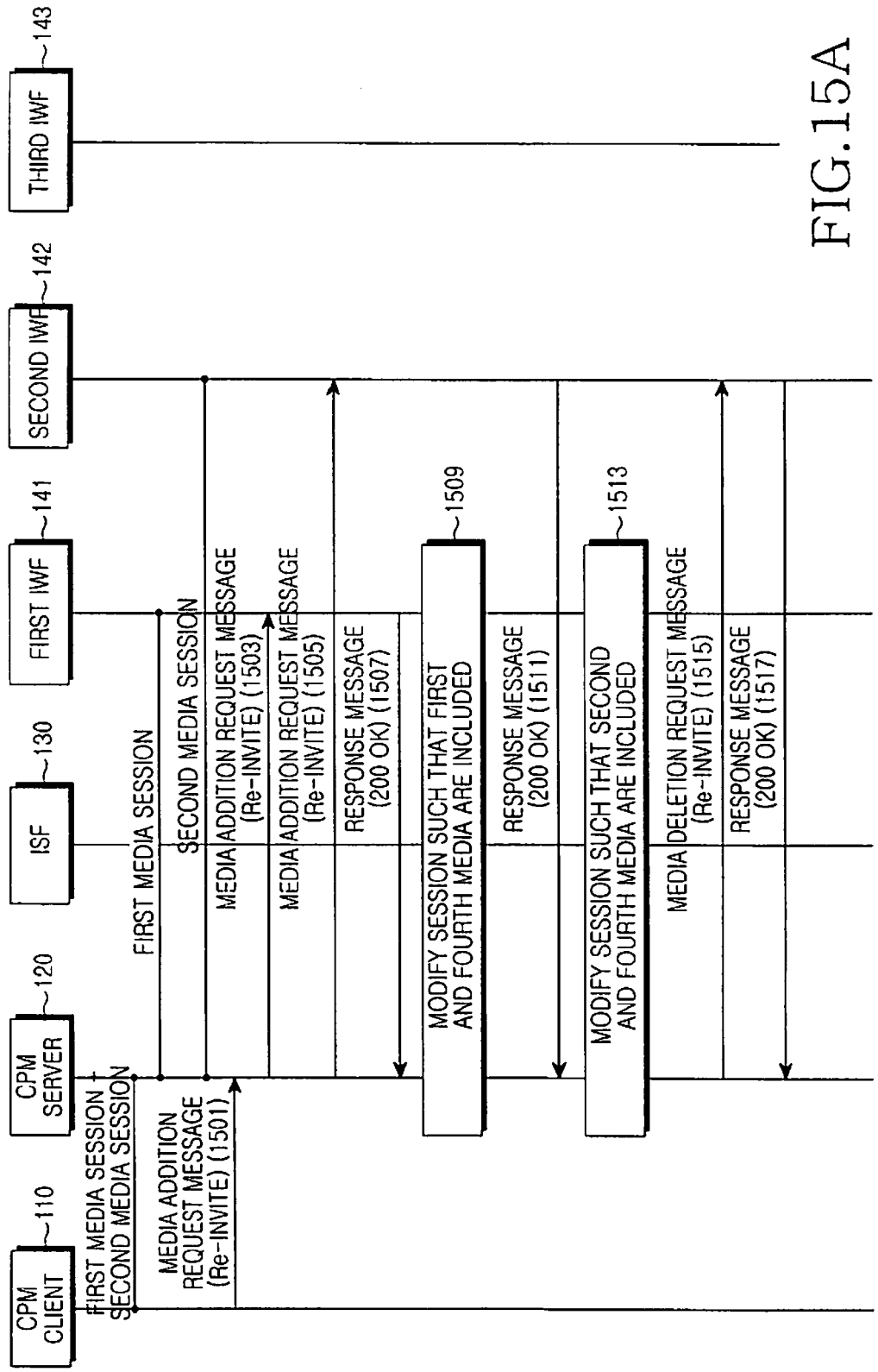

METHOD AND SYSTEM FOR CONTROLLING SESSION FOR INTERWORKING IN CONVERGED IP MESSAGING SERVICE

PRIORITY

This application claims priority to applications entitled "Method and System for Controlling Session for Interworking in Converged IP Messaging Service" filed in the Korean Industrial Property Office on Nov. 28, 2008, Dec. 1, 2008, Feb. 2, 2009, and Jun. 22, 2009 and assigned Serial Nos. 10-2008-0120164, 10-2008-0120688, 10-2009-0008186 and 10-2009-0055705, the contents of each of which are hereby incorporated by reference.

BACKGROUND OF THE INVENTION

1. Field of the Invention

The present invention relates to a method for controlling a session for interworking between a converged IP messaging service and a non-converged IP messaging service, and more particularly to a method for controlling a session in such a manner as to initiate a session between a converged IP messaging service and a non-converged IP messaging service, modifying an already initiated session, and so forth.

2. Description of the Related Art

In the existing mobile environment, terminals perform one-shot messages, such as Short Messaging Service (SMS) messages, Multimedia Messaging Service (MMS) messages, and the like, but users expect messaging services that make it easy to talk with others through an instant messenger in a wired environment. Instant messaging services have been introduced into terminals and networks, based on Session Initiation Protocol/Internet Protocol (SIP/IP) core networks. Also, due to the demand for push-to-talk (e.g. walkie-talkie) from customers and enterprises, Push to talk over Cellular (PoC) services and systems based on SIP/IP core networks have been developed. Furthermore, the rapid change in the market including enterprises and communication business increases the need to integrate and process various types of received messages.

In consideration of this, the Open Mobile Alliance (OMA), a standards body that establishes international open standards for mobile solutions and services, has recently developed technical standards for Converged Internet Protocol (IP) Messaging (CPM) services that are implemented through SIP/IP core networks.

The CPM service is an IP Multimedia Subsystem (IMS)-based messaging service that integrates existing messaging services, such as an SMS, an MMS, etc., into a single service and provides the integrated single service, based on an IP. Unlike the existing messaging services in which transmission/reception is possible within limited networks and terminals, the CPM service provides an IP-based converged service regardless of the kinds of terminals, the types of media, the kinds of networks, and the types of services.

Such a CPM service must be able to integrate and process all types of existing messages. Therefore, the CPM service requires mutual conversion between SMS message formats, MMS message formats, instant messaging service message formats, non-CPM message formats (e.g. PoC), and CPM message formats. The mutual conversion between non-CPM message formats and CPM message formats is referred to as "interworking".

The CPM service supports interworking with various types of non-CPM services. When the sender and receiver of a message belong to different network areas, interworking may be performed in the sender's network or the receiver's network, depending on each service scenario. In order to provide interworking with non-CPM services, a CPM system must configure various network entities. Functions and interrelations of network entities constituting a CPM system will be described with reference to FIG. 1.

FIG. 1 illustrates entities of a CPM system. The CPM system includes a CPM client 110, a CPM server 120, an Interworking Selection Function (ISF) 130, an Interworking Function (IWF) 140, an SIP/IP core network 150, and a remote SIP/IP core network 151. Although a non-CPM client 111 and a non-CPM server 160 are not entities of the CPM system, they are illustrated in the drawing for the purpose of the description of interworking of the CPM system.

The CPM client 110 refers to a CPM service subscriber. The CPM client 110 generates a converged message to send to the CPM server 120, and receives a message, which another CPM client or the non-CPM client 111 sends, from the CPM server 120. The non-CPM client 111 is a client subscribing to a non-CPM service, and exchanges a message with the corresponding non-CPM server 160.

The CPM server 120 processes a message received from the CPM client 110 or another CPM server. To this end, the CPM server 120 determines if interworking is needed. That is, the CPM server 120 determines if interworking is needed for the received message in order to communicate with the non-CPM server 160.

For example, if the CPM server 120 determines that interworking is needed, then the CPM server 120 delivers a received message to the ISF 130. If the CPM server 120 determines that interworking is not needed, then the CPM server 120 delivers a received message to a receiving CPM client or a CPM server to which the receiving CPM client belongs. That is, when a receiving CPM client belongs to the same network area as the CPM server 120, the CPM server 120 delivers a received message to the receiving CPM client. However, when a receiving CPM client belongs to a different network area from the CPM server 120, the CPM server 120 delivers a received message to a CPM server of the different network area. Also, the CPM server 120 delivers a message, received from the ISF 130 or the IWF 140 for interworking, to the non-CPM client 111 corresponding to the destination address of the received message.

The ISF 130 selects a non-CPM server 160 that can most effectively deliver a message, received from the CPM server 120, to a receiving party, and delivers the received message to the IWF 140 that is actually responsible for interworking with the selected non-CPM server 160.

The IWF 140 is a functional entity for providing direct interworking with a non-CPM service, and performs mutual conversion between the formats of CPM and non-CPM service messages to then deliver the converted message to the non-CPM server 160.

The SIP/IP core network 150 is a functional entity for delivering control signals of SIP-based services, messages generated by clients or service entities thereof, etc. to receivers or other entities. To this end, the SIP/IP core network 150 may exchange messages with SIP/IP core networks belonging to other provider areas.

The remote SIP/IP core network 151 is an SIP/IP core network provided and managed by another network provider, and has the same function as the SIP/IP core network 150. Although not illustrated in FIG. 1, entities, devices, and systems for providing CPM and non-CPM services may be implemented in the remote SIP/IP core network 151.

The non-CPM server 160 serves to provide messaging services excluding the CPM service. The messaging services provided by the non-CPM server 150 include an SMS, an MMS, an instant messaging service, PoC, and the like.

Reference will now be made to an interworking operation with reference to FIG. 2. FIG. 2 illustrates message sending/receiving for interworking between a CPM service and a non-CPM service. In particular, FIG. 2 shows message sending/receiving on the assumption that a sending CPM client 110 requests a receiving non-CPM client 111 to set up a session, and any media type requested by the CPM client 110 can be processed in any single IWF.

In step 201, the CPM client 110 sends to a CPM server 120 an INVITE message requesting session initiation. The INVITE message includes necessary information for session initiation in the form of a Session Description Protocol (SDP).

In step 203, on receiving the INVITE message from the CPM client 110, the CPM server 120 checks if the receiving client is a CPM service subscriber and is in an available state, thereby determining if interworking is needed. Interworking is needed when the receiving client is a non-CPM client, and is not needed when the receiving client is a CPM client and is in an available state, or the receiving client is a CPM client and is in an unavailable state. It is assumed here that the receiving client is a non-CPM client 111. Thus, in step 205, the CPM server 120 delivers to the ISF 130 the INVITE message. However, if interworking is not needed, then a different operation is performed. That is, when the receiving client is a CPM client and is in an available state, the INVITE message is delivered to the receiving CPM client to initiate a session. Also, when the receiving client is a CPM client and is in an unavailable state, the INVITE message may be deleted, temporarily stored in the CPM server 120, or delivered to the ISF 130 for message forwarding through the non-CPM service, according to user settings. However, this scenario is not illustrated in the drawing.

In consideration of the presence and preference of the receiving client, media types requested by the INVITE message, a service to which the receiving client subscribes, etc., the ISF 130 selects in step 207 an IWF 140 that is most suitable to perform interworking between the CPM service and the non-CPM service, and delivers the INVITE message to the selected IWF 140 in step 209. The presence refers to information including the type of a service to which a client subscribes, and the preference refers to user settings, etc.

In step 211, on receiving the INVITE message, the IWF 140 determines if it can support media types which are included in the INVITE message and for which session initiation is requested. Assuming that the IWF 140 can support the requested media types, in step 211, the IWF 140 converts the received INVITE message into a non-CPM message, based on a format suitable for the non-CPM service. For reference, the INVITE message is converted as follows: a specific header, parameter, or SDP body in the INVITE message is adapted to the corresponding non-CPM message format when the non-CPM service supportable by the IWF 140 is an SIP-based service, such as SIMPLE IM, POC, etc., and the INVITE message is converted into a message format suitable for the protocol of the corresponding non-CPM service when the non-CPM service supportable by the IWF 140 is a non-SIP-based service, such as an SMS, an MMS, etc.

If none of the requested media types can be supported by the IWF 140, then the IWF 140 sends a corresponding response message (e.g. "415 Unsupported Media Type") to the ISF 130. On receiving the "415 Unsupported Media Type" message, the ISF 130 may deliver the message to the sending CPM client 110 via the CPM server 120, or select another IWF and retry interworking, depending on the service policy. Also, if some of the requested media types can be supported by the IWF 140, then the session request for unsupported media types is omitted in the process of the message conversion.

In step 213, the IWF 140 delivers the converted non-CPM message to the corresponding non-CPM server 160, which in turn delivers the converted non-CPM message to the receiving non-CPM client 111 in step 215. In steps 217 and 219, the non-CPM client 111 delivers a response message to the IWF 140 via the non-CPM server 160, in response to the non-CPM message received from the non-CPM server 160.

In step 221, the IWF 140 converts the response message, received via the non-CPM server 160, into a message suitable for the CPM message format, for example, an OK message according to the SIP message format, and then in step 223, delivers the converted response message to the ISF 130. In step 225, the ISF 130 delivers the converted response message to the CPM server 120.

In step 227, the CPM server 120 initiates a session for allowed media types with the IWF 140, and then in step 229, sends an OK message, a response message to the session initiation message in step 201, to the sending CPM client 110. Subsequently, in step 231, the CPM client initiates a session for sending/receiving of the allowed media types with the CPM server 120.

However, the above-mentioned interworking operation in the conventional CPM system has the following problem. When only some of media types requested by the CPM client 110 can be supported by the IWF 140, interworking is not performed for unsupported media types, and thus they cannot be provided with the CPM service, as described in step 211. Since this leads to a deterioration of the quality of the CPM service, there is a need to minimize such a restriction.

SUMMARY OF THE INVENTION

Accordingly, the present invention has been made to solve at least the above-mentioned problems occurring in the prior art, and the present invention provides a method for supporting interworking even for media types unsupported by a specific IWF in a CPM system.

Further, the present invention provides a method for selecting another IWF for a media type unsupported by a specific IWF in a CPM system.

Further, the present invention provides a method for initiating a session with a different IWF according to media types and controlling the initiated session in a CPM system.

Further, the present invention provides a method for modifying a session, which is initiated with a different IWF according to media types, by adding new media to the initiated session in a CPM system.

Further, the present invention provides a method for modifying a session, which is initiated with a different IWF according to media types, by deleting media included in the initiated session in a CPM system.

Further, the present invention provides a method for modifying a session, which is initiated with a different IWF according to media types, by deleting media included in the initiated session and adding new media to the initiated session in a CPM system.

In accordance with an aspect of the present invention, there is provided a session control method in a Converged IP Messaging (CPM) server for supporting a CPM session between a first client subscribing to a CPM service and a second client not subscribing to the CPM service, the session control method includes, after the CPM session is initiated between the first and second clients through the CPM server and an Interworking Function (IWF), receiving a session modification request message including specific media from the first client; sending the session modification request message including the specific media to the IWF through the initiated CPM session; and receiving a response message from the IWF, the response message including a reason for rejection of the session modification request message including the specific media.

The session control method may further include, when the reason for rejection, included in the response message, is that the specific media is unsupported by the IWF, sending a session request for the rejected specific media to an Interworking Selection Function (ISF).

In accordance with another aspect of the present invention, there is provided a session control method in an IWF for supporting a CPM session between a first client subscribing to a CPM service and a second client not subscribing to the CPM service, the session control method includes, after the CPM session is initiated between the first and second clients through a CPM server and the IWF, receiving a session modification request message including specific media from the first client through the CPM server; and when the specific media is unsupported by the IWF, sending a response message to the CPM server, the response message including a reason for rejection, which is an indication that the specific media is unsupported by the IWF.

In accordance with yet another aspect of the present invention, there is provided an interworking apparatus for supporting a CPM session between a first client subscribing to a CPM service and a second client not subscribing to the CPM service, the interworking apparatus including at least one IWF for supporting each of at least one media, and generating a reason for rejection, which is an indication that a corresponding media is unsupported by the IWF, when receiving an interworking request for the media unsupported by the IWF; and an ISF for selecting an entity to undertake interworking of specific media from among the at least one IWF when receiving a session modification request message including the specific media from the first client through a CPM server after the CPM session is initiated between the first and second clients through the CPM server and the IWF.

The interworking apparatus may further include a controller for instructing the ISF to reselect an entity to undertake interworking of the specific media when receiving the reason of rejection, which is an indication that the specific media is unsupported by the IWF, from the IWF.

In accordance with still yet another aspect of the present invention, there is provided a session control method in a CPM server for supporting a CPM session between a first client subscribing to a CPM service and a second client not subscribing to the CPM service, the session control method includes receiving a session initiation message including specific media from the first client; sending the session initiation message to including the specific media to an IWF through an ISF; and receiving a response message from the IWF through the ISF, the response message including a reason for rejection of the session initiation message.

The session control method may further include, when the reason for rejection is that the specific media is unsupported by the IWF, resending the session initiation message including the specific media to the ISF.

In accordance with still yet another aspect of the present invention, there is provided a session control method in an IWF for supporting a CPM session between a first client subscribing to a CPM service and a second client not subscribing to the CPM service, the session control method including the steps of receiving a session initiation message including specific media from the first client through a CPM server; and when the specific media is unsupported by the IWF, sending a response message to the CPM server, the response message including a reason for rejection, which is an indication that the specific media is unsupported by the IWF.

In accordance with still yet another aspect of the present invention, there is provided an interworking apparatus for supporting a CPM session between a first client subscribing to a CPM service and a second client not subscribing to the CPM service, the interworking apparatus including at least one IWF for supporting each of at least one media, and generating a reason for rejection, which is an indication that a corresponding media is unsupported by the IWF, when receiving an interworking request for the media unsupported by the IWF; and an ISF for selecting an entity to undertake interworking of specific media from among the at least one IWF when receiving a session initiation request message including the specific media from the first client through a CPM server.

The interworking apparatus may further include a controller for instructing the ISF to reselect an entity to undertake interworking of the specific media when receiving the reason of rejection, which is an indication that the specific media is unsupported by the IWF, from the IWF.

BRIEF DESCRIPTION OF THE DRAWINGS

The above and other objects, features and advantages of the present invention will be more apparent from the following detailed description taken in conjunction with the accompanying drawings, in which:

FIGS. 3A and 3B are a message flowchart for explaining an operation of initiating a session in a proxy mode of a CPM system in accordance with a first embodiment of the present invention;

FIG. 4 is a flowchart illustrating an operation of an IWF in a proxy mode in accordance with the first embodiment of the present invention;

FIGS. 8A and 8B are a message flowchart for explaining an operation of modifying an already initiated session by adding a new media type to the already initiated session and simultaneously deleting an existing media type from the already initiated session in a proxy mode in accordance with a fourth embodiment of the present invention;

FIGS. 15A and 15B are a message flowchart for explaining an operation of adding new media to an already initiated session when an IWF operates in a proxy mode in accordance with the second embodiment of the present invention.

DETAILED DESCRIPTION OF THE EXEMPLARY EMBODIMENT

Figure 1:
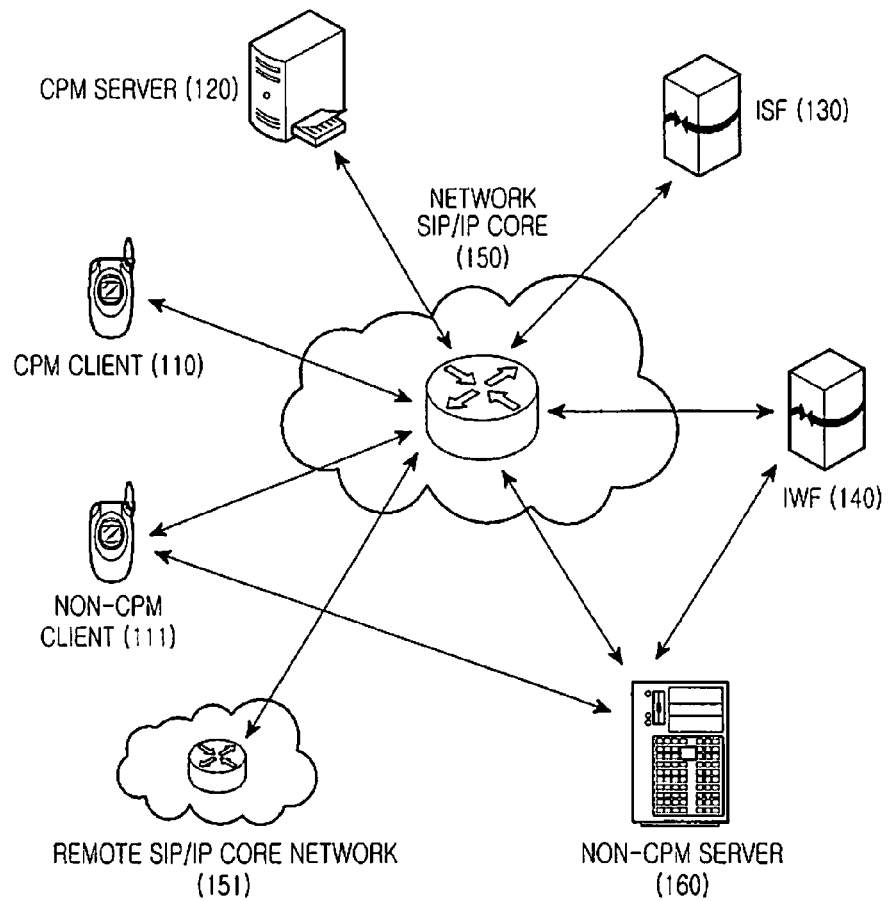
FIG. 1 is a diagram illustrating entities of a CPM system.
Figure 2:
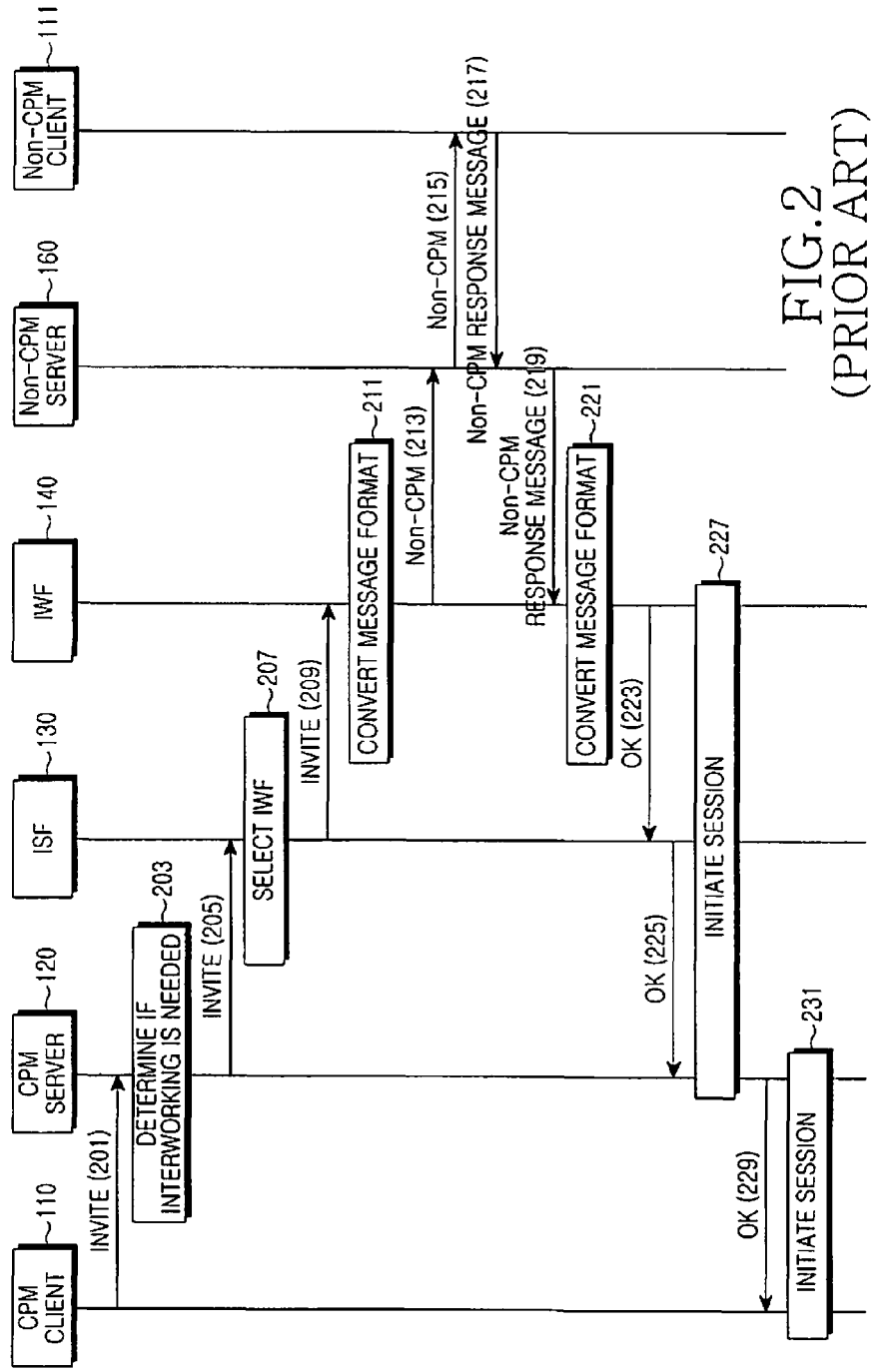
FIG. 2 is a message flowchart for explaining message sending/receiving for interworking between a CPM service and a non-CPM service.

Hereinafter, embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

Before a description of the present invention is given, an Interworking Selection Function (ISF) and an Interworking Function (IWF) to be applied in a Converged IP Messaging (CPM) system of the present invention will be described in detail.

In the present invention, the ISF may be included in a CPM server or the IWF, or may be implemented as an independent entity according to the implementation environment of the CPM system. Alternatively, the ISF and the IWF may be implemented as a single device.

Also, the ISF may operate in a proxy mode or a Back-to-Back User Agent (B2BUA) mode according to the message processing scheme of the CPM system.

In the proxy mode, the major operations of the ISF include IWF selection, message delivery, etc. The message delivery refers to an operation of delivering a message, received from a CPM server, to a selected IWF, delivering a response message, received from the IWF, to the CPM server, and the like. Also, it is possible to allow the ISF to modify a specific header field or parameter of the received message when delivering the received message. However, a message body part is not generally permitted to be modified. Nevertheless, since an exceptional case may occur, in which a message body part may be modified even in the proxy mode according to the design of the CPM system, the present invention proposes that the ISF will operate differently for each of both the cases. However, in the case of the proxy mode where a message body part is permitted to be modified, the IWF is not located on an initiated session, and thus media delivered through the initiated session do not pass through the IWF.

In the B2BUA mode, the major operations of the ISF include IWF selection, and additionally include a User Agent (UA) serving as an IWF for the CPM server or functioning as a CPM server for the IWF. The UA functions as follows: when the ISF receives any message from the CPM server, the UA generates a new message corresponding thereto, and sends the generated message to the CPM server. Thus, for the IWF, the ISF serves as a UA of the CPM server. When the ISF receives any message from the IWF, the ISF generates a new message corresponding thereto, and sends the generated message to the CPM server. Thus, for the CPM server, the ISF serves as a UA of the IWF. In the B2BUA mode, the ISF can control the flow of media delivered through a session by functioning as a UA in this way. Also, in the B2BUA mode, the ISF is located on an initiated session, and thus media delivered through the initiated session passes through the IWF.

Depending on the implementation of the CPM system, a separate IWF for controlling interworking with one specified non-CPM service may be provided for each non-CPM service, or one IWF may control interworking with all non-CPM services or a plurality of non-CPM services. In the specification, embodiments of the present invention will be described on the assumption that a separate IWF is provided for each non-CPM service in the network environment.

First, reference will be made to initial session initiation according to an embodiment of the present invention.

A CPM client sends a session request for media to a CPM server. When interworking is needed, the CPM server delivers the session request to an ISF, and the ISF selects an appropriate IWF and delivers the session request to the selected IWF. The IWF determines whether to allow the session request, and sends a response to the session request. When the IWF rejects the session request, the IWF includes details of rejection in the response.

If a reason for rejection of the session request is that a receiving client gives notification of rejection of the session request, then the rejected session does not need to be requested again. This is because the client party will reject the session request again even when another IWF supports media for which the session request is made. However, if the reason for rejection of the session request is that the IWF cannot support media for which the session request is made, then a session may be initiated by forwarding the session request to another IWF supporting the media.

Therefore, if the IWF includes details of rejection, that is, information on a rejecter or a reason for rejection, in the response to the session request, then whether to forward the rejected session can be determined according to the details of rejection. When the CPM client sends a session request for multiple media, and some of the requested media are rejected, the details of rejection include information on the rejected media. As an example, whether to forward the session request is determined by the CPM server or the ISF.

Next, reference will be made to session modification according to an embodiment of the present invention. The session modification may be largely divided into adding new media to a session, deleting media included in a session, deleting existing media from a session and adding new media to the session, changing existing media types, and so forth. In such cases, a session initiation request is not made and a session modification request is made. When an IWF rejects a session request for adding new media, the IWF sends a response including details of the rejection, and a CPM server determines how to modify the session by taking account of the details of the rejection. This will be described in detail below.

The present invention may be embodied in the "proxy mode" and the "B2BUA" mode, and embodiments of the present invention will now be described based on the main concept of the present invention.

In a first embodiment of the present invention, an operation of initiating an initial session for multiple media in the proxy mode will be discussed with reference to FIGS. 3 to 5 and 13.

In a second embodiment of the present invention, an operation of modifying an already initiated session by adding a new media type thereto in the proxy mode will be discussed with reference to FIGS. 6 and 15.

In a third embodiment of the present invention, an operation of modifying an already initiated session by deleting a specific media type from the already initiated session in the proxy mode will be discussed with reference to FIG. 7.

In a fourth embodiment of the present invention, an operation of modifying an already initiated session by changing a specific media type will be discussed with reference to FIG. 8.

In a fifth embodiment of the present invention, an operation of initiating an initial session for multiple media in the B2BUA mode will be discussed with reference to FIGS. 11 and 14.

In a sixth embodiment of the present invention, an operation of modifying an already initiated session by changing a specific media type in the B2BUA mode will be discussed with reference to FIG. 12.

ISF: Proxy Mode

A. Case where a Message Body Part is not Permitted to be Modified

Figure 3A:
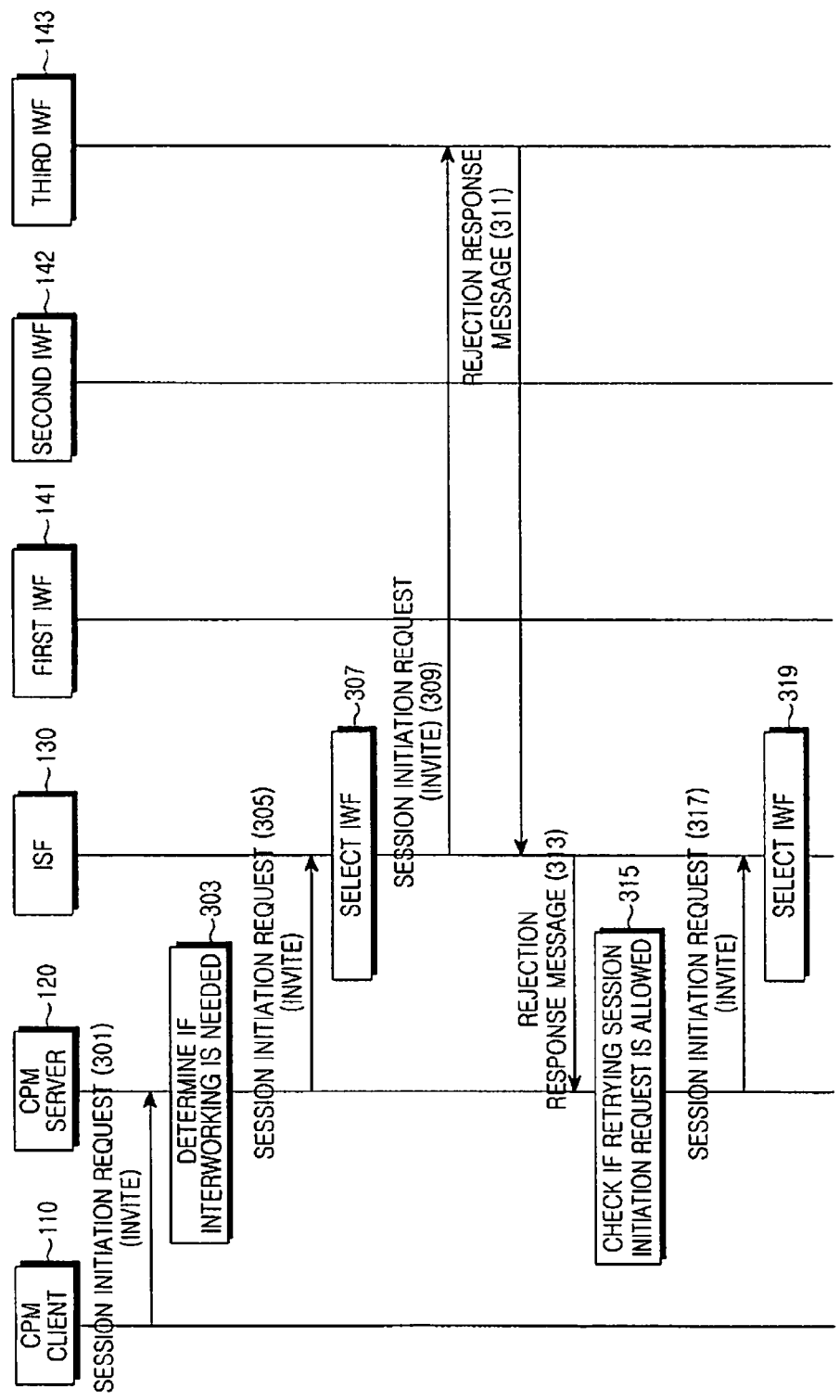

FIG. 3 illustrates an operation of initiating a session when an ISF operates in the proxy mode where a message body part is not permitted to be modified according to the first embodiment of the present invention. The operation in FIG. 3 assumes the following conditions:

(1) A CPM client 110 is to initiate a session that includes first and second media.

(2) A receiving client is a non-CPM client, and subscribes to first, second, and third non-CPM services.

(3) A first IWF 141 performs interworking with the first non-CPM service, a second IWF 142 performs interworking with the second non-CPM service, and a third IWF 143 performs interworking with the third non-CPM service.

(4) The first media is supported by the first non-CPM service, but the second media is unsupported by the first non-CPM service. This is the same for the first IWF 141.

(5) The second media is supported by the second non-CPM service, but the first media is unsupported by the second non-CPM service. This is the same for the second IWF 142.

(6) Both the first and second media are unsupported by the third non-CPM service. This is the same for the third IWF 143.

In FIG. 3, delivery of a session initiation request from each IWF to a receiving non-CPM client and a response thereto are omitted.

In step 301, the CPM client 110 sends a session initiation request message (INVITE) to a CPM server 120. In step 303, on receiving the session initiation request message, the CPM server 120 determines if interworking is needed for the session initiation. In FIG. 3, since the receiving client is a non-CPM client, interworking is needed. Thus, in step 305, the CPM server 120 sends the session initiation request message to an ISF 130.

In step 307, the ISF 130 selects an IWF, which is most suitable to perform the session initiation, based on information including the preference and presence of the receiving client, the media type for which the session initiation request is made, the service to which the receiving client subscribes, the service policy, etc. It is assumed that the ISF 130 selects the third IWF 143 in step 307.

In step 309, the ISF 130 delivers the session initiation request message to the third IWF 143. In step 311, the third IWF 143 generates and sends back a rejection response message to the session initiation request message because the third IWF 143 does not support the first and second media. In step 313, the ISF 130 delivers the received rejection response message to the CPM server 120. The rejection response message includes details of rejection, for example, information on one or more reasons for the rejection, a rejecter, and rejected media.

A specific code number may be used to include the details of rejection in the rejection response message. All SIP response messages include a unique code number that may vary according to the result of processing an SIP request message corresponding to each response message, a reason for errors, and the like. For example, code number "488" may be included in a corresponding response message when an SIP request message, such as a session initiation request or a media addition request, is rejected by an IWF, and code number "606" may be included in a corresponding response message when an SIP request message is rejected by a receiving client. Theses code numbers are merely illustrative, and code numbers may be changed according to system implementations. However, a case may occur in which the CPM server 120 cannot make an accurate determination only by the code number. This is the case where a request for the initiation of a session supporting multiple media types is made, but some of the multiple media are rejected by a user, and some of them are rejected by an IWF. In this case, a response message must directly or indirectly clarify details of the rejection for each rejected media. The format of a rejection response message clarifying details of rejection for each media will be described below in Tables 1 and 3.

In step 315, the CPM server 120 can know from the code number of the rejection response message that the session request is rejected by the IWF, and checks if a retrial to initiate the rejected session is allowed. In FIG. 3, it is assumed that a retrial to make a session initiation request is allowed. Thus, in step 317, the CPM server 120 sends the session initiation request message to the ISF 130 in order to retry session initiation.

In step 319, the ISF 130 selects an appropriate IWF. Of course, the IWF having sent back the rejection response message to the previous session request, that is, the third IWF 143, is not selected. In step 319, it is assumed that the ISF 130 selects the first IWF 141. Thus, in step 321, the ISF 130 delivers the session initiation request message to the first IWF 141.

Since it is assumed that the first media is supported by the first IWF 141, and the second media is unsupported by the first IWF 141, the first IWF 141 can accept the initiation of a session for the first media. Thus, in step 323, the first IWF 141 generates and sends back an acceptance response message (200 OK). Since the second media is rejected by the first IWF 141, the first IWF 141 includes information, indicating that the second media is rejected by the first IWF 141, in the response message according to a method of configuring a partial acceptance response message to a session initiation request, as described below.

In step 325, the ISF 130 delivers the received response message to the CPM server 120. In step 327, a session including the first media is initiated between the CPM server 120 and the first IWF 141.

In step 329, the CPM server 120 generates a session initiation request message for the second media rejected by the first IWF 141, and then in step 331, sends the generated message to the ISF 130. In step 333, the ISF 130 selects an IWF that is most suitable to perform the requested session initiation. Of course, the ISF 130 does not select the first IWF 141 that has sent back the rejection response message to the previous session request including the second media.

In step 333, it is assumed that the ISF 130 selects the second IWF 142. Thus, in step 335, the ISF 130 sends the session initiation request message to the second IWF 142. In step 337, the second IWF 142 generates and sends back an acceptance response message (200 OK) to the session initiation request message. In step 339, the ISF 130 delivers the received response message to the CPM server 120. Subsequently, in step 341, a session including the second media is initiated between the CPM server 120 and the second IWF 142.

In step 343, the CPM server 120 generates a response message to the session initiation request message received in step 301, and sends the generated response message back to the CPM client 110. This response message includes an indication that a session including the first media and a session including the second media are all accepted. Subsequently, in step 345, a session including the first and second media is initiated between the CPM client 110 and the CPM server 120.

In FIG. 3, the ISF 130 and the first to third IWFs 141, 142, 143 may be implemented as a single interworking unit. Such a single interworking unit includes a controller (not shown in the drawing). In the case of this device configuration, the ISF 130 can receive a session initiation request message (INVITE) including the first and second media, and select an IWF for taking charge of interworking of the first and second media. If the ISF 130 selects the third IWF 143, then the ISF 130 sends a media initiation request message to the third IWF 143. As mentioned above, the third IWF 143 cannot support the first and second media. Thus, the third IWF 143 delivers details of the rejection, indicating that the first and second media are rejected due to the attribute of the third IWF 143, to the controller (not shown). Based on this reason for the rejection, the controller instructs the ISF 130 to reselect an IWF for the first and second media, and the ISF 130 may reselect an IWF according to the controller's instruction. As another example, the controller may be so designed as to reselect an IWF, based on a reason for rejection.

Figure 13A:
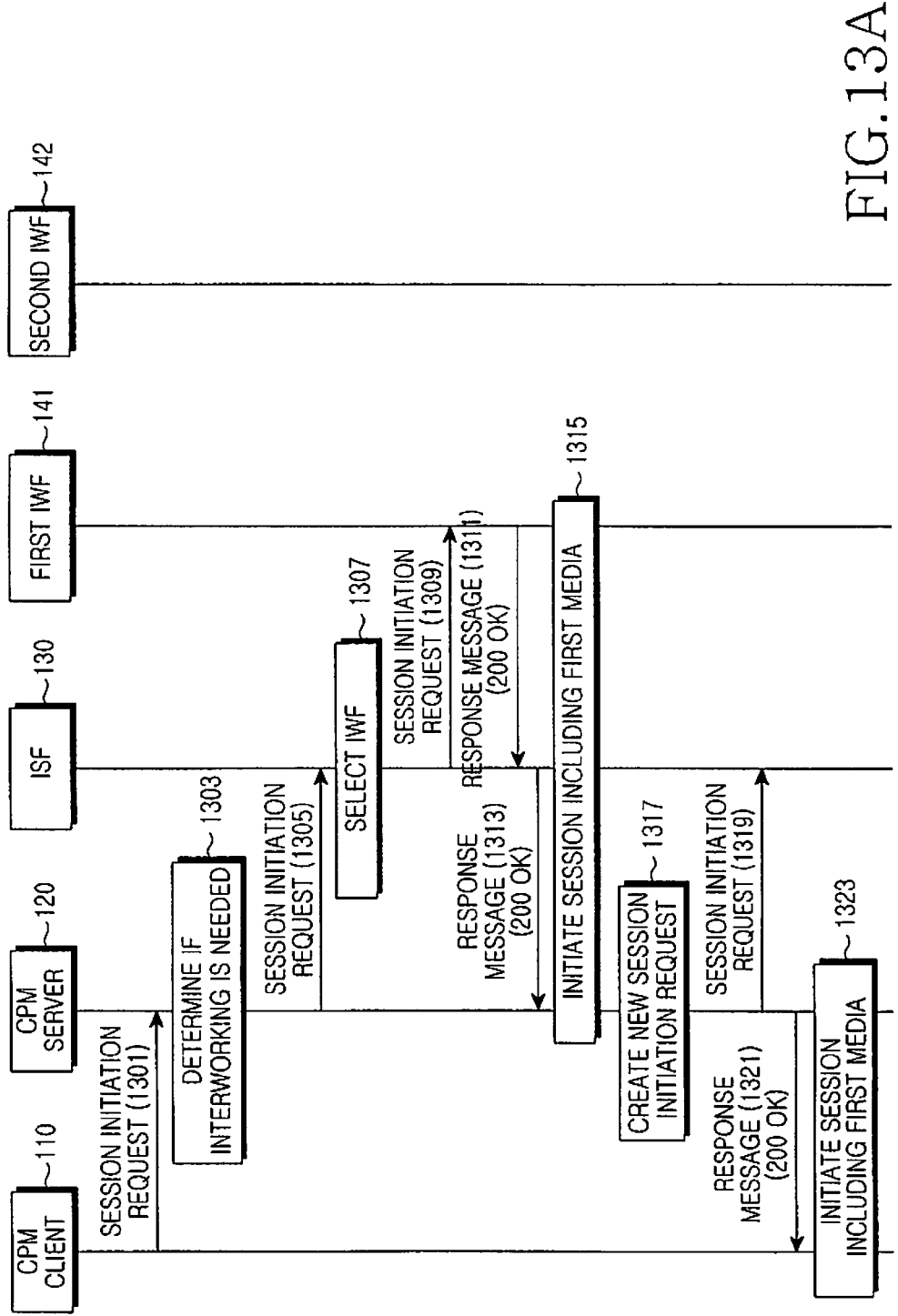
FIGS. 13A and 13B are a message flowchart for explaining another operation of initiating a session when an ISF operates in a proxy mode where a message body part is not allowed to be modified in accordance with the first embodiment of the present invention.
Figure 13B:
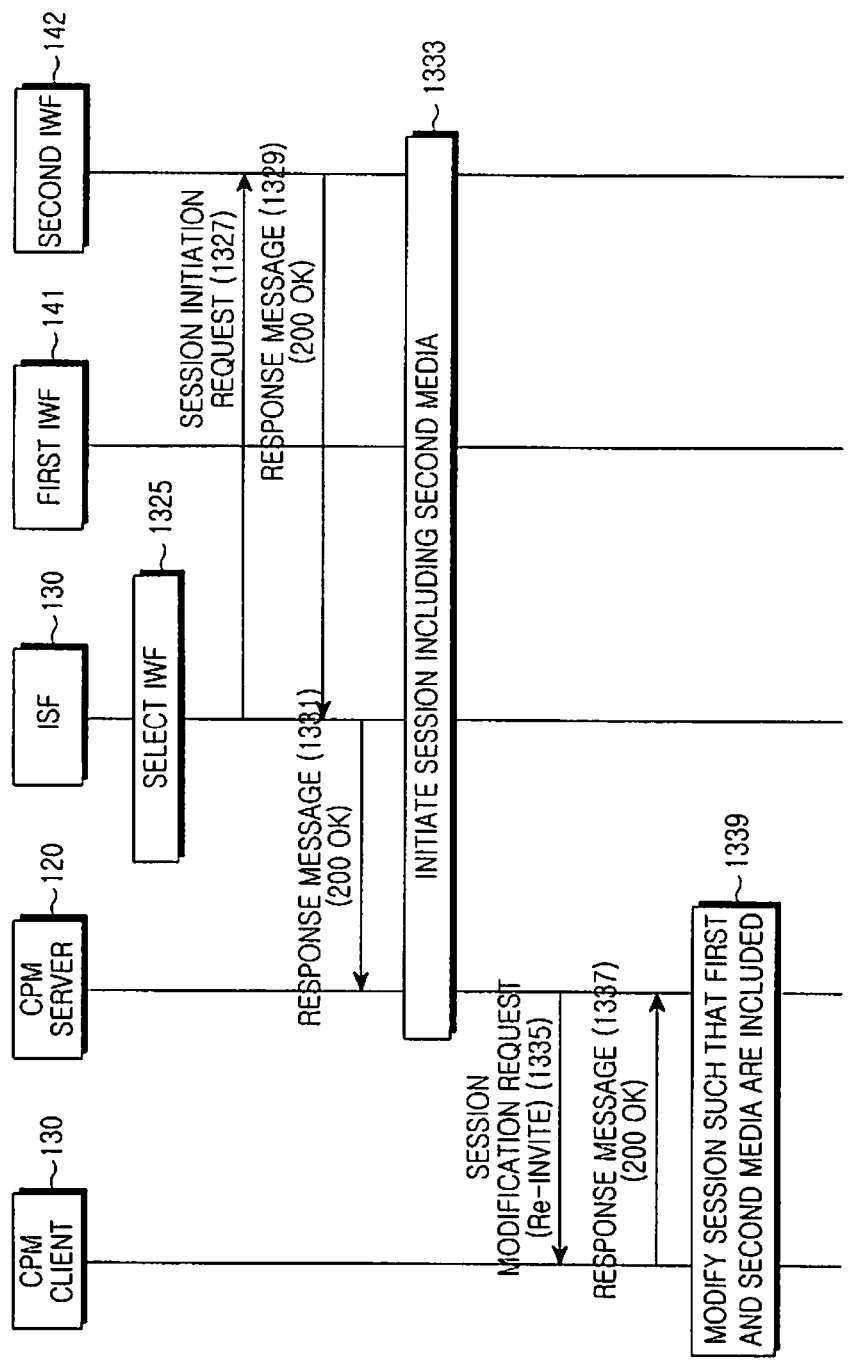

FIGS. 13A and 13B illustrate an operation initiating a session when an ISF operates in the proxy mode where a message body part is not permitted to be modified according to the first embodiment of the present invention.

Comparing the operation of FIG. 13 with that of FIG. 3, these two operations are different in that the CPM server 120 in FIG. 3 receives all the response messages from the first IWF 141 and the second IWF 142, and then combines the received response messages to send the combined response messages to the CPM client 110, but the CPM server 120 in FIG. 13 separately processes the response messages received from the respective IWFs. That is, in FIG. 13, the CPM server 120 first initiates a session with the CPM client 110, based on the response message received from an IWF that primarily performs interworking, that is, the first IWF 141. When the CPM server 120 receives an acceptance response message from an IWF that secondarily performs interworking, that is, the second IWF 142, the CPM server 120 adds media, additionally accepted by the second IWF 142, to the session already initiated between the CPM server 120 and the CPM client 110. In addition, the operation of FIG. 13 assumes the same conditions as those of FIG. 3, except that the receiving client does not subscribe to the third non-CPM service. Therefore, the operation of FIG. 13 is substantially the same as that of FIG. 3, except the above-mentioned difference. The operation of FIG. 13 will now be described.

In step 1301, the CPM client 110 sends a session initiation request message (INVITE) to the CPM server 120. In step 1303, on receiving the session initiation request message, the CPM server 120 determines if interworking is needed for the session initiation. In FIG. 13, since the receiving client is a non-CPM client, interworking is needed. Thus, in step 1305, the CPM server 120 sends the session initiation request message to the ISF 130.

In step 1307, the ISF 130 selects an IWF, which is most suitable to perform the session initiation, based on information including the preference and presence of the receiving client, the media type for which the session initiation request is made, the service to which the receiving client subscribes, the service policy, etc. It is assumed that the ISF 130 selects the first IWF 141 in step 1307.

In step 1309, the ISF 130 delivers the session initiation request message to the first IWF 143. In step 1311, the first IWF 141 generates and sends back "200 OK" as a response message to the session initiation request message because the first IWF 141 supports the first media. In step 1313, the ISF 130 delivers the received response message to the CPM server 120. In step 1311, the first IWF 141 includes in the response message details indicating that the first media is accepted by the receiving-side user, and the second media is unsupported and thus automatically rejected by the IWF.

In step 1315, a session for the accepted first media is initiated between the CPM server 120 and the first IWEF 141. In step 1317, the CPM server 120 creates a new session initiation request for the rejected second media, and then in step 1317, sends the created request to the ISF 130. In step 1315, the first media session may be initiated after step 1317, depending on the operation scheme of the CPM server 120.

In step 1321, the CPM server 120 sends "200 OK", as a response message to the session initiation request received in step 1301, to the CPM client 110. The response message may include a simple indication that the first media is accepted, and the second media is rejected. The actual point in time when the response message is delivered to the CPM client 110 in step 1321 may vary according to the operation scheme of the CPM server 120. In other words, the CPM server 120 may wait for a certain period of time to receive a response message to the new session initiation request sent in step 1319, or may send the response message to the CPM client 110 as soon as receiving the first response message from the ISF 130. FIG. 13 assumes the latter. In the case of the former, when response messages to the new session initiation request are received during a fixed period of time, the CPM server 120 integrates these response messages, and then sends the final response message to the CPM client 110, as in the operation of FIG. 3. If response messages to the new session initiation request are received beyond the fixed period of time, then the CPM server 120, first of all, sends the response message received first to the CPM client 110 to initiate a session for the accepted media, and then modifies or maintains the initiated session according to the contents of the subsequent response messages to the new session initiation request.

In step 1323, the first media session is initiated between the CPM client 110 and the CPM server 120.

In step 1325, the ISF 130 selects an IWF that is most suitable to perform the received new session initiation request, and sends the session initiation request to the selected IWF. In FIG. 13, it is assumed that the ISF 130 selects the second IWF 412. In step 1327, the ISF 130 sends the session initiation request message to the second IWF 142. In step 1329, the second IWF 142 generates and sends back "200 OK" as a response message to the session initiation request because it supports the second media. In step 1331, the ISF 130 delivers the received response message to the CPM server 120.

In step 1333, the second media session is initiated between the CPM server 120 and the second IWF 142.

In step 1335, the CPM server 120 sends a session modification request to the CPM client 110. The session modification request is a request to add the second media session to the first media session initiated between the CPM client 110 and the CPM server 120.

In step 1337, the CPM client 110 sends "200 OK", as an acceptance response message to the session modification request, to the CPM server 120. In step 1339, the session initiated between the CPM client 110 and the CPM server 120 is modified in such a manner as to include both the first and second media.

FIG. 4 illustrates an operation of an IWF in the proxy mode according to the first embodiment of the present invention. In this operation, the IWF performs an operation for sending back a response message to a session initiation request.

In step 401, the IWF check if the session initiation request is rejected, and proceeds to step 403 when the session initiation request is rejected. In step 403, since the session initiation request is rejected, the IWF generates a rejection response message, and sends the generated rejection response message back to the ISF. The response message sent back is sent to the CPM server via the IWF. The IWF generates the rejection response message defined in [RFC(Request for Comments) 3261] according to a reason for rejection. If the session initiation request is accepted (i.e. not rejected) in step 401, then the IWF proceeds to step 405. In step 405, the IWF checks if the session is accepted for all or some of the requested media. When the session is accepted for only some of the requested media, the IWF proceeds to step 407.

In step 407, the IWF generates an acceptance response message (200 OK), and then sends the generated acceptance response message back to the ISF. With regard to this, the IWF includes information, which clarifies whether the rejected media types are rejected by the IWF or the receiving client, in the response message. A way to express such information in the response message will be described below.

When the session is accepted for all of the requested media in step 405, the IWF proceeds to step 409, and generates an acceptance response message (200 OK) to then send the generated acceptance response message back to the ISF.

When some of the requested media are rejected in step 407, the IWF includes a reason for rejection in the response message. In the present invention, a reason for rejection of a session initiation request for media is divided into two categories. The first category corresponds to the case where the request is rejected by notification given from the receiving client, and the second category corresponds to the case where the IWF rejects unsupported media. In the present invention, the IWF includes a reason for the rejection of media in the response message, thereby making it possible to retry to initiate a session for the rejected media type.

As a way to include in a response message information on why or by whom the session initiation for media is rejected, three cases are proposed in the present invention.

Case 1 is described in Table 1.

TABLE 1

SIP/2.0 200 OK
From: <sip:cpm_user@example1.com>;tag=a6c85cf
To: <sip:non-cpm-user@example2.com>;tag=1928301774
CSeq: 314159 INVITE
Call-ID: a84b4c76e66710
Contact: <sip:interworking_function@example2.com>
- omitted
Content-Type: application/sdp
Content-Disposition: session
//SDP ANSWER//
v=0
o=-1357924 1357924 IN IP6 5555::1:2:3:4
s=-
c=IN IP6 5555::1:2:3:4
t=0 0
m=audio 3458 RTP/AVP 97 98
a=rtpmap:97 AMR-WB
a=rtpmap:98 telephone-event
- omitted
m=video 0 RTP/AVP 98 99
a=rejected-by:network In Case 1, "rejected by" SDP Attribute is defined to express information on why or by whom the session initiation for media is rejected. The "rejected-by" denoting the attribute of a media level has the identification value of a rejecter who rejects the session initiation for a corresponding media type. In the present invention, "user" or "network" is illustrated as the attribute value. In the actual implementation, the attribute value may be changed to or replaced by another value. The attribute value "user" represents the case where a receiving client rejects a session initiation request for media, and the attribute value "network" represents the case where an IWF or a non-CPM server of a receiving client rejects a session initiation request for media because it cannot support the corresponding media.

It can be noted from Table 1 that video is rejected on any account because the port number in the media line of video (m=video 0 RTP/AVP 98 99) is set to 0. From the fact that the attribute value "rejected-by" is set to "network", it can also be noted that the requested media type is unsupported by an IWF, and thus the IWF rejects the session request.

In addition to the session initiation request, the above operation of clarifying information on why or by whom a media type is rejected may be performed by an IWF in the same manner for a request for adding new media to an already initiated session.

Case 2 is described in Table 2.

TABLE 2

SIP/2.0 200 OK
From: <sip:cpm_user@example1.com>;tag=a6c85cf
To: <sip:non-cpm-user@example2.com>;tag=1928301774
CSeq: 314159 INVITE
Call-ID: a84b4c76e66710
Contact: <sip:interworking_function@example2.com>audio;video
- omitted
Content-Type: application/sdp
Content-Disposition: session
v=0
o=-1357924 1357924 IN IP6 5555::1:2:3:4
s=-
c=IN IP6 5555::1:2:3:4
t=0 0

TABLE 2-continued

```
m=audio 3458 RTP/AVP 97 98
a=rtpmap:97 AMR-WB
a=rtpmap:98 telephone-event
- omitted
m=video 0 RTP/AVP 98 99
```

In Case 2, an IWF expresses its supported media types in a response message. To this end, the IWF includes feature tags of its supported media, among [RFC 3840] media feature tags, in a response message. In Table 2, since the IWF supports audio and video media, it includes audio and video tags in the "Contact" header.

When a response message generated according to Case 2 includes media tags corresponding to media types for which session initiation is rejected, the corresponding media are considered as rejected by a receiving client. However, when a response message does not include media tags corresponding to rejected media types, the corresponding media are considered as rejected by an IWF.

Case 3 is described in Table 3.

TABLE 3

```
SIP/2.0 200 OK
From: <sip:cpm_user@example1.com>;tag=a6c85cf
To: <sip:non-cpm-user@example2.com>;tag=1928301774
CSeq: 314159 INVITE
Call-ID: a84b4c76e66710
Contact: <sip:interworking_function@example2.com>
Content-Type: multipart/mixed; boundary="abcd"
- omitted
//SDP ANSWER//
--abcd
Content-Type: application/sdp
Content-Disposition: session
v=0
o=–1357924 1357924 IN IP65555::1:2:3:4
s=–
c=IN IP6 5555::1:2:3:4
t=0 0
m=audio 3458 RTP/AVP 97 98
a=rtpmap:97 AMR-WB
a=rtpmap:98 telephone-event
- omitted
m=video 0 RTP/AVP 98 99
--abcd
//SDP CAPABILITY//
Content-Type: application/sdp
Content-Disposition: capability
v=0
o=carol 28908764872 28908764872 IN IP4 100.3.6.6
s=–
t=0 0
c=IN IP4 192.0.2.4
m=audio 0 RTP/AVP 0 1 3
a=rtpmap:0 PCMU/8000
a=rtpmap:1 1016/8000
a=rtpmap:3 GSM/8000
m=video 0 RTP/AVP 31 34
a=rtpmap:31 H261/90000
a=rtpmap:34 H263/90000
--abcd--
```

In Case 3, an IWF includes supported media information as an SDP parameter in a response message. A method of delivering SIP UA capability information by using an SDP parameter is defined in [RFC 3264]. Since an IWF delivers information on its supported media types by using an SDP parameter, a response message includes two SDP bodies.

One of the SDP modes is an SDP body (SDP Answer) for expressing acceptance or rejection of a session initiation request, and the other is an SDP body including information on media supported by an IWF. In order to discern the latter from the former, "capability" is defined as the "Content-Disposition" header value of the latter in the present invention. The "capability" indicates that a corresponding SDP body expresses not an SDP Answer, but capability information of an SIP UA.

In Table 3, the SDP body part, the "Content-Disposition" header value of which is set to "capability", expresses the capability of an IWF. In Table 3, the SDP body corresponding to the capability of an IWF represents the fact that video and audio media are supported by the IWF, codec information supportable for each media, and the like.

When media types supported by an IWF are rejected in a response message generated according to Case 3, the media types are considered as rejected by a receiving client. However, when media types unsupported by an IWF are rejected, the media types are considered as rejected by the IWF.

Figure 5:
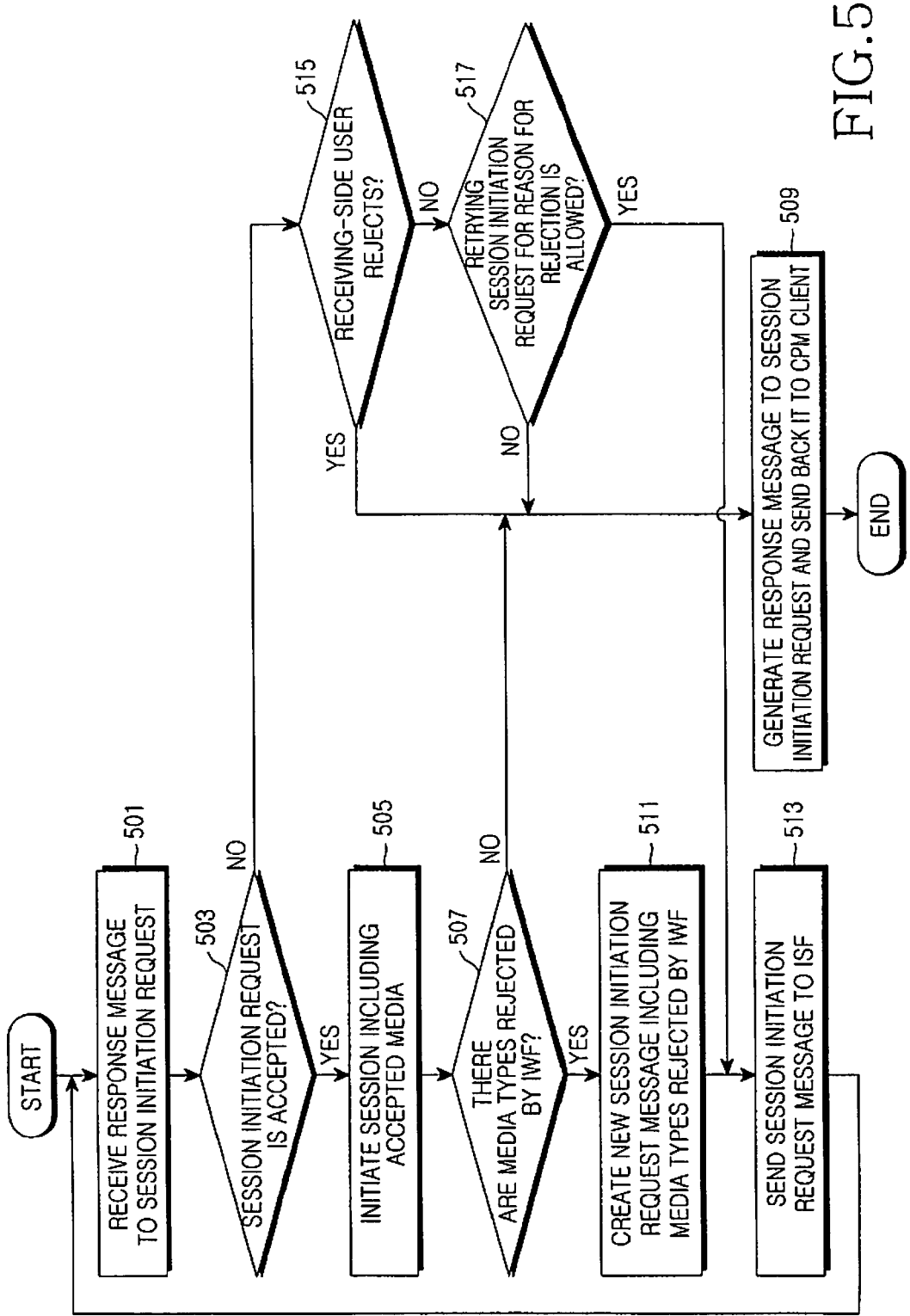
FIG. 5 is a flowchart illustrating an operation of a CPM server in a proxy mode in accordance with the first embodiment of the present invention.

FIG. 5 illustrates an operation of a CPM server when an ISF operates in the proxy mode where a message body part is not permitted to be modified according to the first embodiment of the present invention, as described in FIG. 3.

According to the conventional technology, on receiving a session initiation request message from a CPM client, a CPM server determines if interworking needs to be performed, and then sends the session initiation request message to an ISF when interworking needs to be performed. That is, the CPM server sends the session initiation request message to the address of a receiving client when interworking is not needed, and sends the session initiation request message to a corresponding IWF via an ISF when interworking is needed.

In the first embodiment of the present invention, the CMP server operates in the same manner as in the conventional technology in order to process a session initiation request message. However, the CPM server operates in a different manner as in the conventional technology in that it receives a response message to the session initiation request message from an ISF. That is, when there are media that are rejected by an IWF from among media for which session initiation is requested, the CPM server retries to initiate a session for the rejected media according to details of the rejection, included in a response message.

In step 501, the CPM server receives a response message to the session initiation request message from the ISF. In step 503, when the response message is an acceptance response message (200 OK), the CPM server proceeds to step 505, and initiates a session including the accepted media with the ISF. In step 507, CMP determines if there are media types that are rejected due to the attribute of an IWF, that is, media types unsupported by an IWF, from among media types for which session initiation is requested. The CPM sever proceeds to step 511 when there are rejected media types, and proceeds to step 509 when there are no rejected media types.

The case where there are no media types that are rejected due to the attribute of an IWF corresponds to the case where all the requested media types are accepted, or the case where some media types are rejected by a receiving client. Thus, in step 509, the CPM server generates a response message to the session initiation request message, and sends the generated response message back to the CPM client having sent the session initiation request message.

In step 511, the CPM server regenerates the session initiation request message (INVITE) for the media types rejected due to the attribute of an IWF. In step 513, the CPM server sends the regenerated session initiation request message to the ISF, and returns to step 501, in which the CPM server again receives a response message to the session initiation request message from the ISF.

If the session initiation request is not accepted in step 503, then the CPM server proceeds to step 515, and checks if the session initiation request is rejected by the receiving client. The CPM server proceeds to step 509 when the session initiation request is rejected by the receiving client, and proceeds to step 517 when the session initiation request is not rejected by the receiving client.

In step 517, the CPM server discovers a reason for rejection of the session initiation request through a predefined code number, thereby checking if the session initiation request may be retried. Whether the session initiation request may be retried is determined in consideration of the reason for the rejection of the session initiation request. Also, the CPM server may consider whether retrying the session initiation request is allowed pursuant to the service policy, whether a limited number of retrials is exceeded, and so forth. If retrying the session initiation request is allowed, then the CPM server proceeds to step 513, and resends the session initiation request message for the rejected media to the ISF. However, if retrying the session initiation request is not allowed, then the CPM server proceeds to step 509, and sends a response message back to the CPM client.

After a session is initiated between the CPM client and the CPM server through interworking, the session must be modified at the request of the CPM client. Hereinafter, an operation of modifying an already initiated session according to embodiments of the present invention will be described.

Session modification includes (1) adding new media to an already initiated session, which will be described as a second embodiment of the present invention in FIG. 6; (2) deleting media included in an already initiated session, which will be described as a third embodiment of the present invention in FIG. 7; and (3) changing media types of an already initiated session, that is, deleting existing media and simultaneously adding new media, which will be described as a fourth embodiment of the present invention in FIG. 8.

A CPM client requests a CPM server to modify a session by sending a session modification request message to the CPM server. According to the above three scenarios, the session modification request message may be format-converted into a media addition request message in case (1), may be format-converted into a media deletion request message in case (2), and may be format-converted into a media change request message in case (3).

Figure 6A:
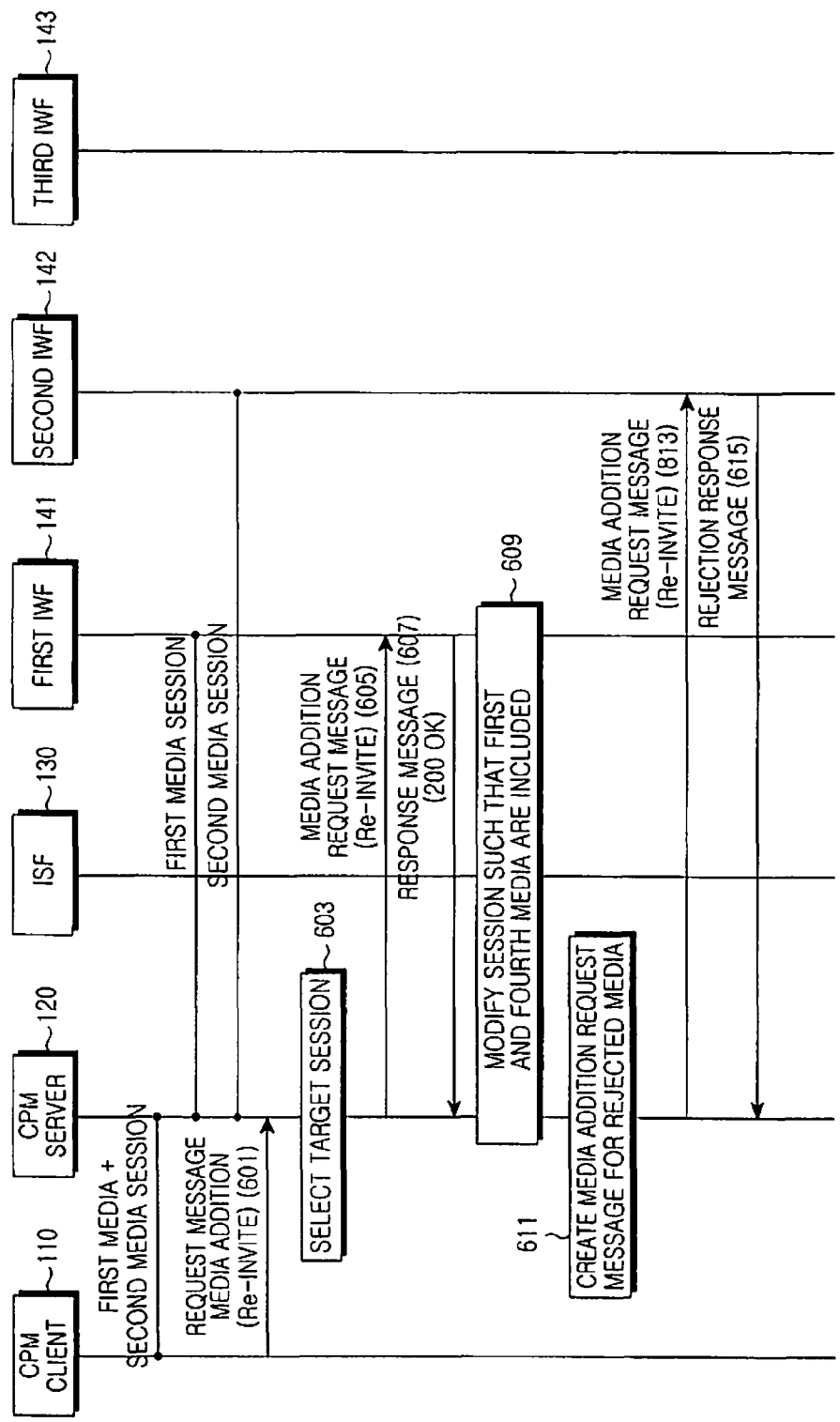
FIGS. 6A and 6B are a message flowchart for explaining an operation of adding a new media type to an already initiated session in a proxy mode in accordance with a second embodiment of the present invention.
Figure 6B:
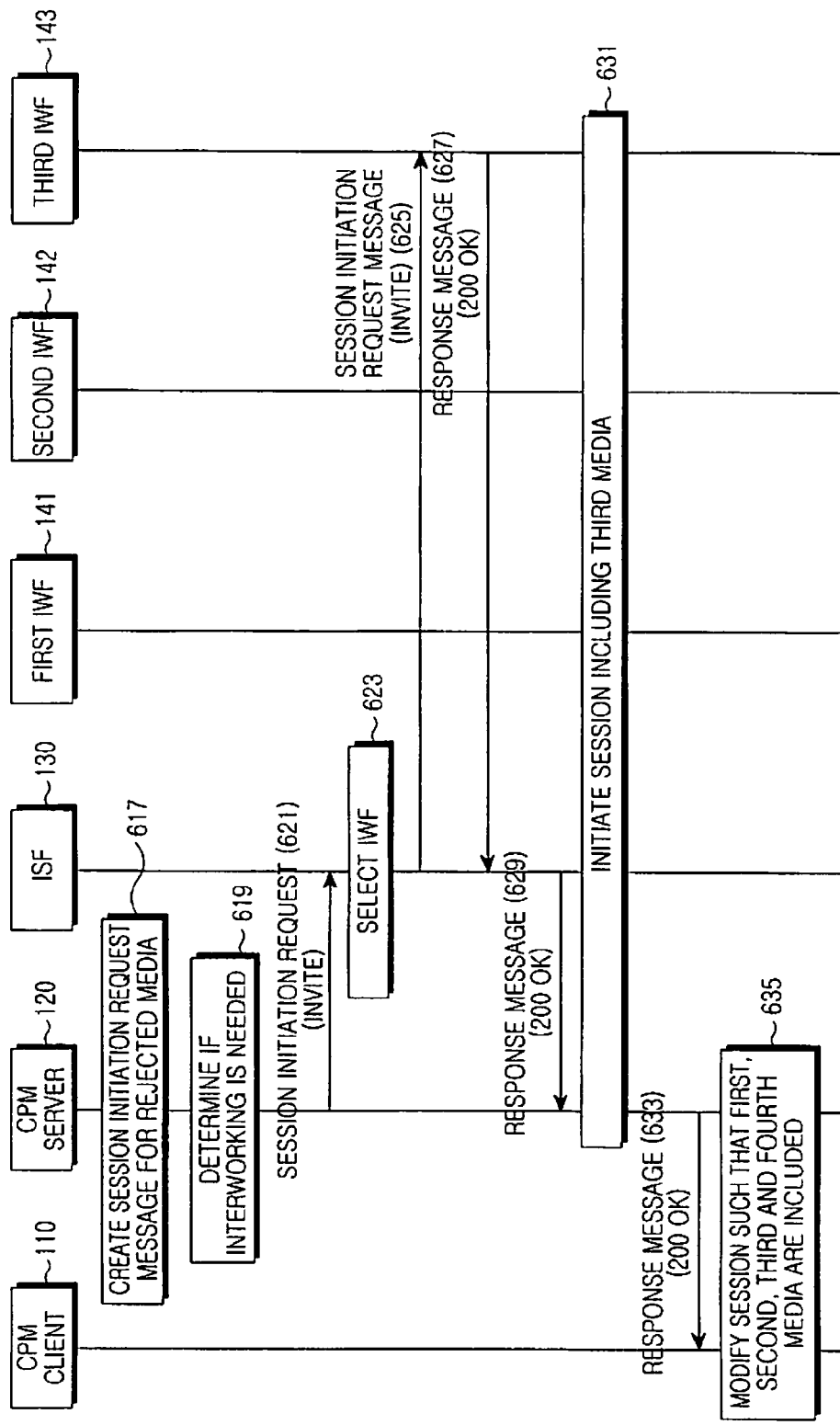

FIGS. 6A and 6B illustrate an operation of adding a new media type to an already initiated session when an ISF operates in the proxy mode where a message body part is not permitted to be modified according to a second embodiment of the present invention. The operation in FIG. 6 assumes the following conditions:

(1) A session including first and second media is initiated between a CPM client and a CPM server.

(2) In order to send/receive the first media to/from a receiving client, the CPM server has initiated a session including the first media with a first IWF.

(3) In order to send/receive the second media to/from the receiving client, the CPM server has initiated a session including the second media with a second IWF.

(4) The first and second IWFs do not support third media. Also, the first IWF supports fourth media.

(5) A third IWF supports the third media, and performs interworking with a third non-CPM service.

(6) The receiving client subscribes to the third non-CPM service supporting the third media.

In step 601, the CPM client 110 sends a media addition request message for adding the third and fourth media to the (first media+second media) session initiated between the CPM client 110 and the CPM server 120. The media addition request message includes SDP parameters for the first, second, third, and forth media.

In step 603, media sessions connected to the (first media+second media) session initiated between the CPM client 10 and the CPM server 120 are the first media session initiated between the CPM server 120 and the first IWF 141 and the second media session initiated between the CPM server 120 and the second IWF 412.

In step 603, the CPM server 120 selects one of the first media session and the second media session. In step 603, it is assumed that the CPM server 120 selects the first media session. In step 605, the CPM server 120 sends a media addition request message (Re-INVITE) to the first IWF 141 to which the first media session is connected. The media addition request message includes SDP parameters for the first, third, and fourth media.

In step 607, the first IWF 141 accepts the first and fourth media included in the media addition request message, but rejects the third media because the first IWF 141 cannot support the third media. Thus, the first IWF 141 sends a response message (200 OK) including such details back to the CPM server 120. With regard to this, the details of the response message includes information indicating that the third media is rejected due to the attribute of the first IWF 141. In step 609, the session initiated between the CPM server 120 and the first IWF 141 is modified in such a manner as to include the first and fourth media.

In step 611, the CPM server 120 retries a media addition request for the third media rejected due to the attribute of the first 141. That is, the CPM server 120 tries to add the third media to the second session to which any media addition request is not tried yet. To this end, the CPM server 120 generates a media addition request message (Re-INVITE) for adding the third media to the second session, and sends the generated media addition request message to the second IWF 142 in step 613. The media addition request message includes SDP parameters for the second and third media.

In step 615, the second IWF 142 accepts the second media included in the media addition request message because the second media is included in the existing session, but rejects the third media because it cannot support the third media. Thus, in step 617, the second IWF 142 generates and sends back a response message (200 OK) including such details. With regard to this, the details of the response message includes information indicating that the third media is rejected due to the attribute of the second IWF 142.

In step 617, since there is no session to which the third media rejected by the first and second IWFs 141, 142 may be added, the CPM server 120 generates a session initiation request message for the third media, and determines in step 619 if interworking is needed for the generated session initiation request message. Assuming that interworking is needed, the CPM server 120 sends the session initiation request message to the ISF 130 in step 621.

In step 623, the ISF 130 selects an IWF that is most suitable to process the session initiation request message. Assuming that the third IWF 413 is selected, the ISF 130 sends the session initiation request message to the third IWF 413 in step 625, and the third IWF 413 generates and sends back an acceptance response message in step 627. In step 629, the ISF 130 delivers the response message to the CPM server 120. In step 631, a session including the third media is initiated between the CPM server 120 and the third IWF 143. In step 633, the CPM server 120 generates a response message to the media addition request message, and then sends the generated response message back to the CPM client 110. In step 635, the existing session initiated between the CPM client 110 and the CPM server 120 is modified in such a manner as to include the first, second, third, and fourth media.

In FIG. 6, the ISF 130 and the first to third IWFs 141, 142, 143 may be implemented as a single interworking unit. Such a single interworking unit includes a controller (not shown in the drawing). In the case of this device configuration, the ISF 130 can receive a media addition request message for adding the third and fourth media from the CPM server 120, and select an IWF for controlling interworking of the requested third and fourth media. If the ISF 130 selects the first IWF 141, then it sends a media addition request message to the first IWF 141. As mentioned above, the first IWF 141 cannot support the third media. Thus, the first IWF 141 delivers details, indicating that the third media is rejected due to the attribute of the first IWF 141, to the controller (not shown). Based on this reason for the rejection, the controller instructs the ISF 130 to reselect an IWF for the third media, and the ISF 130 may reselect an IWF according to the controller's instruction. As another example, the controller may be so designed as to reselect an IWF, based on a reason for the rejection.

In the above operation, the CPM server 120 repeats to send a media addition request message to any one IWF, even when the CPM server 120 initiates media sessions with a plurality of IWFs in step 603. However, depending on the operation scheme of the CPM server 120, the CPM server 120 may simultaneously send a media addition request message to the respective IWFs, each of which initiates a media session with the CPM server 120. However, this may cause the case where an addition request for the same media is accepted by different IWFs at the same time, the CPM server 120 must prevent the same media from being added to different IWFs at the same time by checking all received response messages.

Therefore, as a way to prevent overlapping addition of the same media, the CPM server 120 may wait until response messages are received from all IWFs to which a media addition request is sent, so as to prevent the same media from being added to different IWFs at the same time. Alternatively, the CPM server 120 may prevent overlapping addition of the same media by processing an OK response message received first from one IWF, generating a session termination request message (BYE) or a media deletion request message (Re-INVITE) when overlapping addition of the same media is caused by an OK response message received later on from another IWF, and then sending the generated message to the corresponding IWF.

Figure 15B:
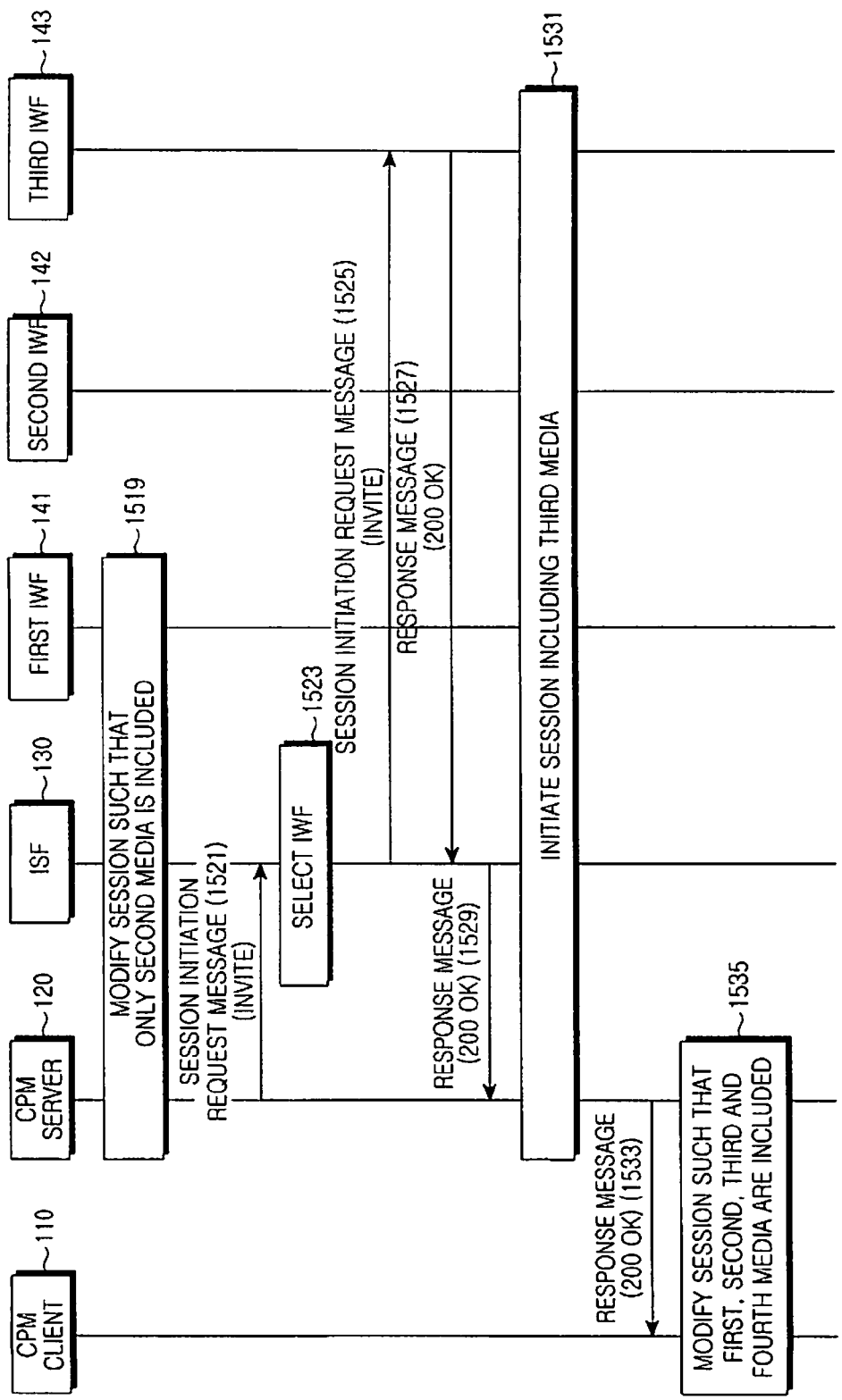

FIG. 15 illustrates an operation of adding a new media type to an already initiated session when an ISF operates in the proxy mode where a message body part is not allowed to be modified according to the second embodiment of the present invention. The operation of FIG. 15 is different from that of FIG. 6 in that the CPM server tries to simultaneously send a media addition request to all relevant IWFs.

The operation of FIG. 15 assumes the same conditions as in FIG. 6, except the following conditions:

(1) The first IWF and the second IWF do not support the third media.

(2) The first IWF and the second IWF support the fourth media.

In step 1501, the CPM client 110 sends a media addition request message for adding the third and fourth media to the (first media+second media) session initiated between the CPM client 110 and the CPM server 120. The media addition request message includes SDP parameters for the first, second, third, and forth media.

In step 1503, media sessions connected to the (first media+second media) session initiated between the CPM client 10 and the CPM server 120 are the first media session initiated between the CPM server 120 and the first IWF 141 and the second media session initiated between the CPM server 120 and the second IWF 412.

In step 1503, the CPM server 120 sends a media addition request message (Re-INVITE) to the first IWF 141 to which the first media session is connected. The media addition request message includes SDP parameters for the first, third, and fourth media.

In step 1505, the CPM server 120 sends a media addition request message (Re-INVITE) to the second IWF 142 to which the second media session is connected. The media addition request message includes SDP parameters for the second, third, and fourth media.

In step 1507, the first IWF 141 accepts the first and fourth media included in the media addition request message, but rejects the third media because the IWF 141 cannot support the third media. Thus, the first IWF 141 sends a response message (200 OK) including such details back to the CPM server 120. With regard to this, the details of the response message includes information indicating that the third media is rejected due to the attribute of the first IWF 141. In step 1509, the session initiated between the CPM server 120 and the first IWF 141 is modified in such a manner as to include the first and fourth media.

In step 1511, the second IWF 142 accepts the second and fourth media included in the media addition request message, but rejects the third media because it cannot support the third media. Thus, in step 1513, the second IWF 142 generates and sends back a response message (200 OK) including such details. With regard to this, the details of the response message includes information indicating that the third media is rejected due to the attribute of the second IWF 142. In step 1513, the session initiated between the CPM server 120 and the second IWF 142 is modified in such a manner as to include the first and fourth media.

As a result of performing the above steps, the third media is added to the first IWF 141 and the second IWF 142 at the same time. Thus, in order to prevent overlapping addition of the third media, the CPM server 120 generates a media deletion request message (Re-INVITE) for deleting the third media added later on, and sends the generated media deletion request message to the second IWF 142.

In step 1517, the second IWF 142 sends an acceptance response message to the CPM server 120 in response to the media deletion request message. In step 1519, the session initiated between the CPM server 120 and the second IWF 142 is modified such that the third media is deleted from the session, and only the second media is included in the session.

A description of subsequent steps will be omitted because they have been already described in FIG. 6.

However, the operation of the CPM server 120, as described in FIG. 15, may vary somewhat according to the implementation of the CPM server 120. For example, the CPM server 120 receives response messages from the first IWF 141 and the second IWF 142 in FIG. 15, but the CPM server 120 may send an SIP UPDATE message or an SIP CANCEL message according to the implementation scheme or settings of the server, so long as it has received an OK response message from the first IWF 141, but has not yet received a response message from the second IWF 142.

The SIP CANCEL message is sent when all media to be added are accepted by the first IWF 141, and is intended to cancel the media addition request message sent to the second IWF 142.

The SIP UPDATE message may be used when only some of media requested to be added to the first IWF 141 are accepted while the others are rejected, and is intended to delete the media accepted by the first IWF 141 from the media addition request message sent to the second IWF 142.

Figure 7:
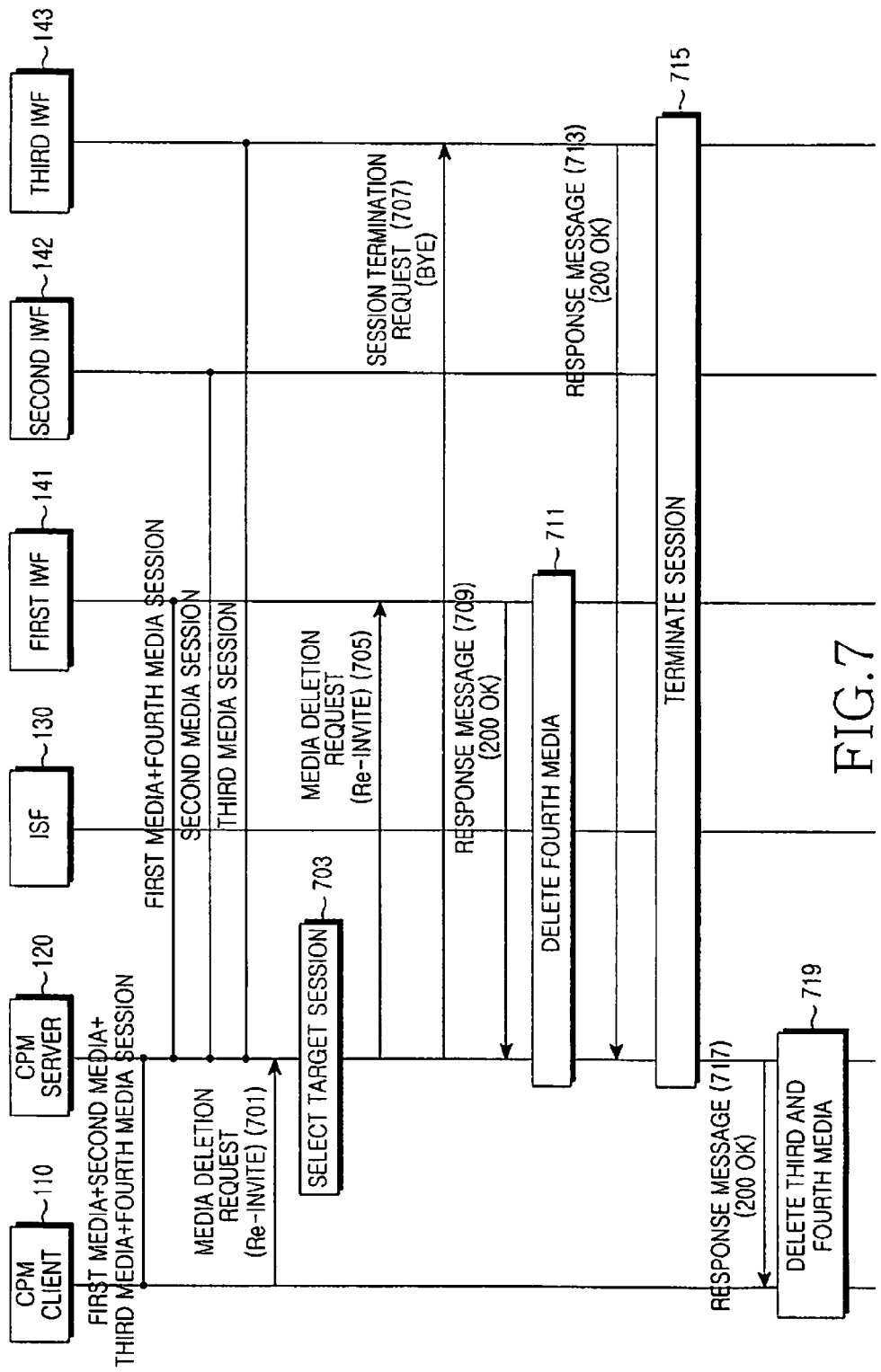
FIG. 7 is a message flowchart for explaining an operation of modifying an already initiated session by deleting a specific media type from the already initiated session in a proxy mode in accordance with a third embodiment of the present invention.

FIG. 7 illustrates an operation of modifying an already initiated session by deleting a specific media type when an ISF operates in the proxy mode where a message body part is not permitted to be modified according to a third embodiment of the present invention. The situation envisioned in FIG. 7 supposes that the third and fourth media added through the operation of FIG. 6 are again deleted.

In step 701, the CPM client 110 sends a media deletion request message for deleting the third and fourth media from the session initiated between the CPM client 110 and the CPM server 120 to the CPM server 120. The media deletion request message includes SDP parameters for the first and second media.

In step 703, the CPM server 120 selects a target session for the media deletion request. That is, the CPM server 120 selects the third session initiated between the CPM server 120 and the third IWF 143 in order to delete the third media, and selects the (first media+fourth media) session initiated between the CPM server 120 and the first IWF 141 in order to delete the fourth media.

In step 705, the CPM server 120 generates a media deletion request message for deleting the fourth media from the selected (first media+fourth media) session, and then sends the generated media deletion request message to the first IWF 141. In step 707, the CPM server 120 is to generate a media deletion request message, which requests the selected third media session to delete the third media. However, since the third media session does not include media other than the third media, the CPM server 120 generates a session termination message (BYE), and then sends the session termination message to the third IWF 143.

In step 709, the first IWF 141 generates an acceptance response message to the fourth media deletion request message, and then sends the acceptance response message back to the CPM server 120. In step 711, the fourth media is deleted from the (first media+fourth media) session initiated between the CPM server 120 and the first IWF 141. In step 713, the third IWF 143 generates an acceptance response message to the session termination request received in step 707, and then sends the acceptance response message back to the CPM server 120. In step 715, the third media session initiated between the CPM server 120 and the third IWF 143 is terminated.

In step 717, the CPM server 120 generated a response message to the media deletion request received in step 7021, and then sends the response message to the CPM client 110. In step 719, the third and fourth media are deleted from the (first media+second media+third media+fourth media) session initiated between the CPM client 110 and the CPM server 120.

Figure 8A:
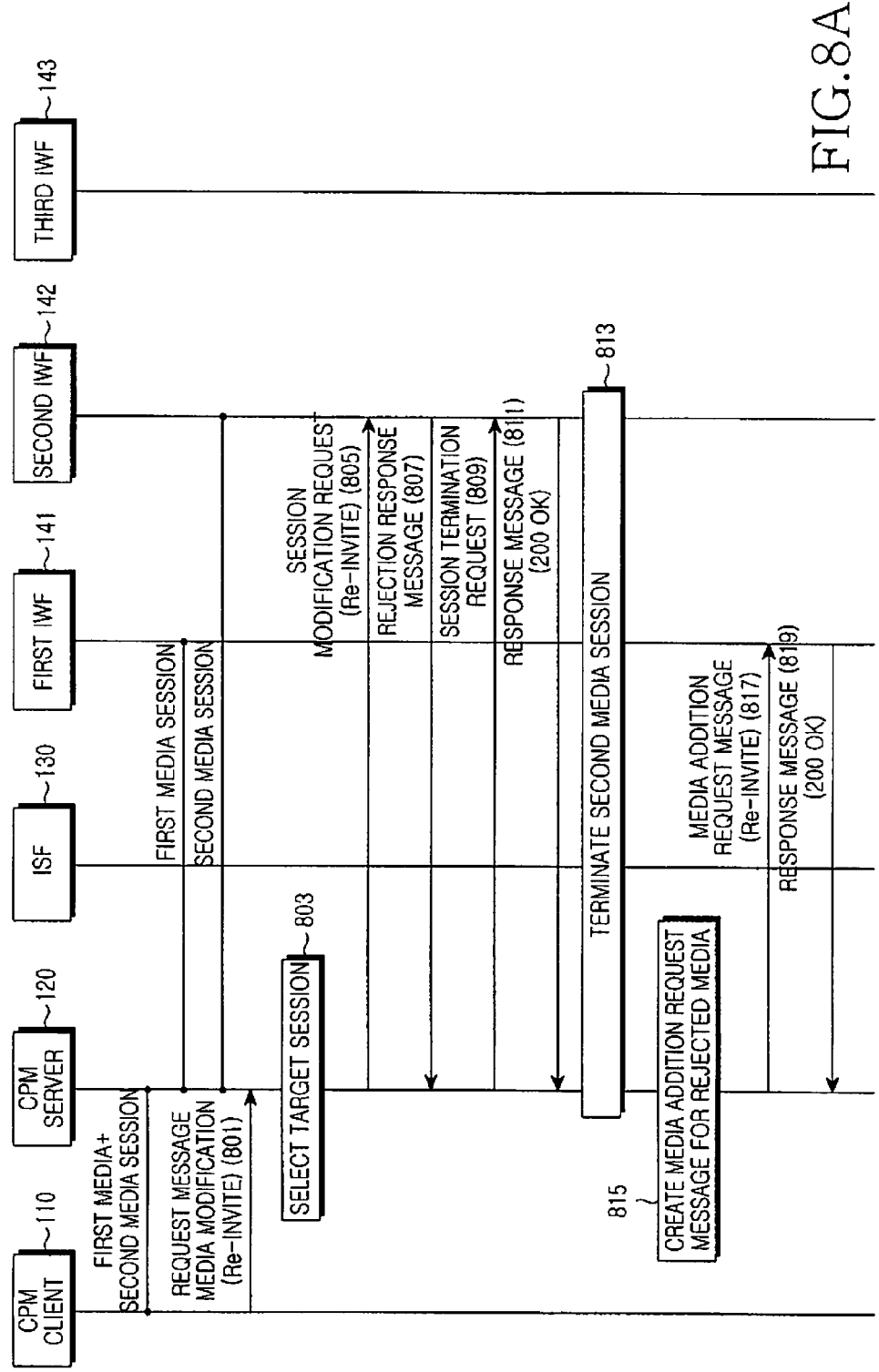

FIGS. 8A and 8B illustrate an operation of modifying an already initiated session by adding new media to the session and simultaneously deleting existing media from the session when an ISF operates in the proxy mode where a message body part is not permitted to be modified according to a fourth embodiment of the present invention. That is, the operation of FIG. 8 corresponds to an operation of changing a specific media type, and the situation envisioned in FIG. 8 supposes that the third and fourth media are added to the session initiated through the operation of FIG. 3, and the second media is deleted from the session.

In step 801, the CPM client 110 sends a media modification request message for adding the third and fourth media to and deleting the second media from the session initiated between the CPM client 110 and the CPM server 120 to the CPM server 120. The media modification request message includes SDP parameters for the first, third, and fourth media.

In step 803, the CPM server 120 selects a target session for the media deletion request. That is, the CPM server 120 selects the second session initiated between the CPM server 120 and the second IWF 142 in order to delete the second media. In step 805, the CPM server generates a session modification request message for adding the third and fourth media to and deleting the second media from the selected second media session, and sends the session modification request message to the second IWF 142. The session modification message includes SDP parameters for the third and fourth media.

In step 807, the second IWF 142 sends back a rejection response message because the second IWF 142 cannot support the third and fourth media. In step 809, the CPM server 120 may generate the second media deletion request message again, and send the second media deletion request message to the second IWF 142. However, since the second media session does not include media other than the second media to be deleted, the CPM server 120 sends a session termination request message (BYE), instead of the media deletion request message, to the second IWF 142. In step 811, the second IWF 142 sends back an acceptance response message to the session termination request message. In step 813, the second media session initiated between the CPM server 120 and the second IWF 142 is terminated.

In step 815, since adding the third and fourth media to the second session is rejected due to the attribute of the second IWF 142, the CPM server 120 generates a media addition request message for adding the third and fourth media to the first media session to which the media addition request is not sent yet, and then in step 817, sends the generated media addition request message to the first IWF 141. The media addition request message includes SDP parameters for first, third, and fourth media.

In step 819, since the first IWF 141 supports the first and fourth media, but does not support the third media, the first IWF 141 accepts the first and fourth media, but rejects the third media. Thus, the first IWF 141 sends back a response message including such details. That is, the response message includes information indicating that the third media is rejected due to the attribute of the first IWF 141. Since the first and fourth media are accepted, in step 821, the first media session is modified in such a manner as to include first and fourth media.

In step 823, the CPM server 120 retries the addition request for the third media that has been rejected due to the attribute of the first or second IWF 141, 142. However, since the CPM server 120 has requested media addition to the already initiated sessions, the CPM server 120 generates a session initiation request message for the third media, instead of a media addition request message. Subsequently, in step 825, the CPM server 120 determines if interworking is needed for the generated session initiation request message. In FIG. 8, it is assumed that interworking is needed.

In step 827, the CPM server 120 sends the session initiation request message for the third media to the ISF 130. In step 829, the ISF 130 selects an IWF that is most suitable for session initiation. It is assumed here that the third IWF 143 is selected. In step 831, the ISF 130 sends a session initiation request message to the third IWF 143. In step 833, the third IWF 143 generates an acceptance response message to the session initiation request, and sends the acceptance response message back to the ISF 130. In step 835, the ISF 130 delivers the response message to the CPM server 120, and then in step 837, the third media session is initiated between the CPM server 120 and the third IWF 143.

In step 839, the CPM server 120 generates a response message to the session modification request message (message for adding the third and fourth media, and deleting the second media) received in step 801, and then sends the response message back to the CPM client 110. The response message includes details indicating that all the CPM client 110 requested is accepted. In step 841, the session between the CPM client 110 and the CPM server 120 is modified in such a manner as to include the first, third, and fourth media.

Reference will now be made to how the CPM server operates in the second to fourth embodiments of the present invention. The operation illustrated in FIG. 9 corresponds to the case where the CPM server receives a session modification request message from the CPM client, and the operation illustrated in FIGS. 10A and 10B corresponds to the case where the CPM server receives a response message to a session modification request from an IWF.

Figure 9:
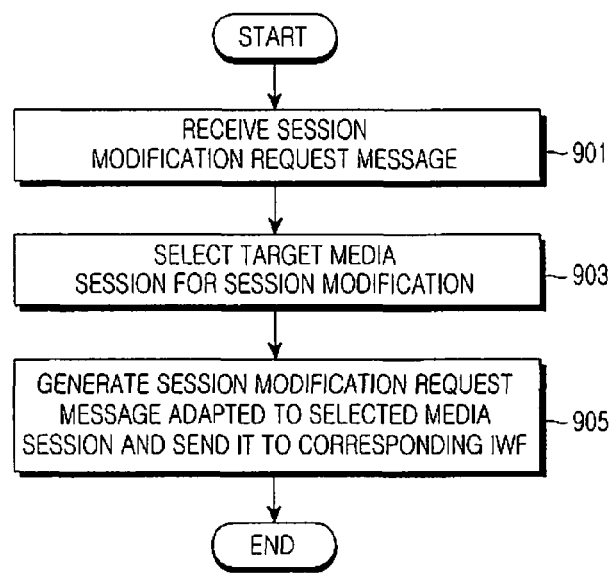
FIG. 9 is a flowchart illustrating an operation of a CPM server that receives a session modification request in a proxy mode in accordance with the second to fourth embodiments of the present invention.

FIG. 9 illustrates an operation of a CPM server that receives a session modification request message when an ISF operates in the proxy mode where a message body part is not permitted to be modified according to the second to fourth embodiments of the present invention.

In step 901, the CPM server receives a session modification message (Re-INVITE) from the CPM client. The session modification request message includes information indicating that a session to be modified is the session initiated between the CPM server and the CPM client. In step 903, the CPM server selects a target media session for the session modification request from among sessions mapped to a receiving client. When there are several target media sessions for the session modification request, the CPM server immediately selects the several media sessions. For example, if the session modification request is a request for deleting media of several media types or changing a media type, and all the requested media are not included in one media session, then media sessions each including the requested media may be all selected.

When the CPM server selects the media session, it may operate as follows:

If the session modification request from the CPM client is a media addition request, then the CPM server may store details included in a response message, which has been sent back from an IWF at session initiation, and then utilize the details. That is, when a response message from an IWF includes information on media types supported by the corresponding IWF, as shown in Table 2 or 3, the CPM server may store information on the corresponding media types, and then utilize the information to check if the media requested in the media addition request message are supported to the corresponding IWF, and to select a target media session to which to add the requested media. If the session modification request is a media deletion request for specific media or a request for changing specific media to other media, then the CPM server can immediately select the media session because it knows which media is included in the current media session.

In step 905, the CPM server generates a session modification request message adapted to the selected media session, and sends the session modification request message to an IWF participating in the corresponding media session. When several media sessions are selected as a media session to be modified, the CPM server generates session modification request messages for the several media sessions, and sends the session modification request messages to the corresponding IWFs.

If the session modification request is a media deletion request, and the selected media session includes media other than the requested media, then the CPM server generates a media deletion request message (Re-INVITE), and sends the media deletion request message to the corresponding IWF. However, if the selected media session does not include media other than the requested media, then the CPM server generates a session termination request message (BYE) for the selected media session, and sends the session termination request message to the corresponding IWF.

FIG. 10 illustrates an operation of a CPM server that receives a response message from an IWF when an ISF operates in the proxy mode where a message body part is not permitted to be modified according to the second to fourth embodiments of the present invention. FIG. 10 assumes that a media addition request included in a session modification request message may be rejected by a receiving client or due to the attribute of the IWF, but a media deletion request and a media type change request may be rejected only by a receiving client.

In step 1001, the CPM server 120 receives a response message to a session modification request from the ISF 130. In step 1003, when the response message is a response to a session modification request including a media addition request, the CPM server 120 proceeds to step 1005. The session modification request including a media addition request refers to a request for only adding new media or a request for changing media types. In step 1005, when the response message is an acceptance response message (200 OK), the CPM server 120 proceeds to step 1007, and modifies the corresponding session such that the requested media is added thereto. However, when the response message is not an acceptance response message, the CPM server 120 proceeds to step 1025.

In step 1009, if media is rejected due to the attribute of the IWF among the requested media, then the CPM server proceeds to step 1011. Otherwise, the CPM server 120 proceeds to step 1023, and generates a response message to the session modification request from the CPM client, and sends the response message back to the CPM client.

In step 1011, if there are media sessions to which the media session modification request is not yet sent among media sessions connected to the CPM server 120, then the CPM server 120 proceeds to step 1013. In step 1013, the CPM server selects any one of the media sessions to which the media session modification request is not yet sent, and generates a media addition request message for the rejected media, adapted to the selected media session. In step 1015, the CPM server sends the generated media addition request message to the selected IWF. Subsequently, the CPM server returns to step 1001 in order to process a response message to the sent media addition request message.

In step 1011, if there are no media sessions to which the media session modification request is not yet sent, then the CPM server proceeds to step 1029. In step 1029, the CPM server 120 generates a session initiation request message (INVITE) for the media rejected due to the attribute of the IWF. In step 1031, the CPM server determines if interworking is needed for the generated session initiation request message. When interworking is needed, the CPM server proceeds to step 1033, and sends the session initiation request message to the ISF 130. When interworking is not needed, the CPM server proceeds to step 1035.

Since no need for interworking means that the receiving client is a CPM client, the CPM server sends the session initiation request message to the address of the receiving client. When the receiving client is located in the same network area as the CPM server 120, the session initiation request message is sent to the receiving CPM client 110. However, when the receiving client is located in a different network area, the session initiation request message is sent to the CPM server 120 belonging to the corresponding network area. Subsequently, if the CPM server 120 receives a response message to the session initiation request, then the CPM server 120 returns to step 1001 in order to process the response message.

In step 1003, when the received response message is not a response message to a session modification request including a media addition request, that is, when the received response message is a response message to a media deletion request, the CPM server proceeds to step 1017. In step 1017, when the received response message is an acceptance response message (200 OK), that is, when the session modification request is accepted, the CPM server proceeds to step 1019, and modifies the target media session such that the accepted details, that is, the media deletion, is reflected in the target media session. However, when the received response message is a rejection response message, the CPM server proceeds to step 1021, and maintains the existing session. In step 1023, the CPM server generates a response message to the session modification request from the CPM client 110, and sends the response message back to the CPM client 110.

In step 1005, when the received response message is a rejection response message, the CPM server proceeds to step 1025. In step 1025, since retrying the session modification request is not needed if the rejection response is not due to the attribute of the IWF, the CPM server proceeds to step 1021, and maintains the existing session. If the rejection response is due to the attribute of the IWF, then the CPM server proceeds to step 1026. In step 1026, the CPM server determines if the rejection response is a rejection response to a media addition request or a media type change request. In the case of a rejection response to a media addition request, the CPM server proceeds to step 1011, and creates a media addition request message or a media initiation request message.

However, when the rejection response is a rejection response to a media type change request, steps 1011 and 1027 are performed at the same time. That is, the media type change request is a request for adding new media and deleting previous media. However, since the new media for the addition request are not supported by the IWF, the CPM server 120 must separately make a media addition request and a media deletion request. Thus, in step 1027, the CPM server generates a media deletion request message, and resends it to the corresponding IWF. At the same time, the CPM server 120 proceeds to step 1011 and subsequent steps, and processes the media addition request.

B. Case where a Message Body Part is Permitted to be Modified

An IWF operating in the proxy mode where a message body part is permitted to be modified operates in substantially the same manner as an ISF operating in the B2BUA mode. However, the process is different in that while an ISF operating in the B2BUA mode sets the destination address and port of media to those of an IWF in the SDP body of a message before delivering the message, an ISF operating in the B2BUA mode sends an SDP body received from a CPM server in its entirety because the CPM server cannot modify the message body. A procedure of initiating and modifying a session when an ISF operates in the B2BUA mode will be described below.

ISF: B2BUA Mode

When an IWF operates in the proxy mode, one session including all media requested by a CPM client is initiated between the CPM client and a CPM server, and several media sessions may be initiated between the CPM server and the IWF according to media types supported by the IWF. Therefore, one session diverges into several media sessions at the CPM server.

When the IWF operates in the B2BUA mode, one session including all media requested by a CPM client is initiated between the CPM client and the CPM server, as well as between the CPM server and an ISF. However, several media sessions may be initiated between the ISF and the IWF according to media types supported by the IWF. Therefore, dissimilar to the proxy mode, one session diverges into several media sessions at the ISF.

Each entity in the B2BUA mode operates as follows:

On receiving a session initiation or modification request message, the CPM server determines if interworking is needed, and then sends the session initiation or modification request message to the ISF when interworking is needed. Also, on receiving a response message to the session initiation or modification request message from the ISF, the CPM server delivers the response message to the CPM client.

The IWF operates in the same manner as in the proxy mode, and the ISF operates in substantially the same manner as the CPM server in the proxy mode.

Figure 11A:
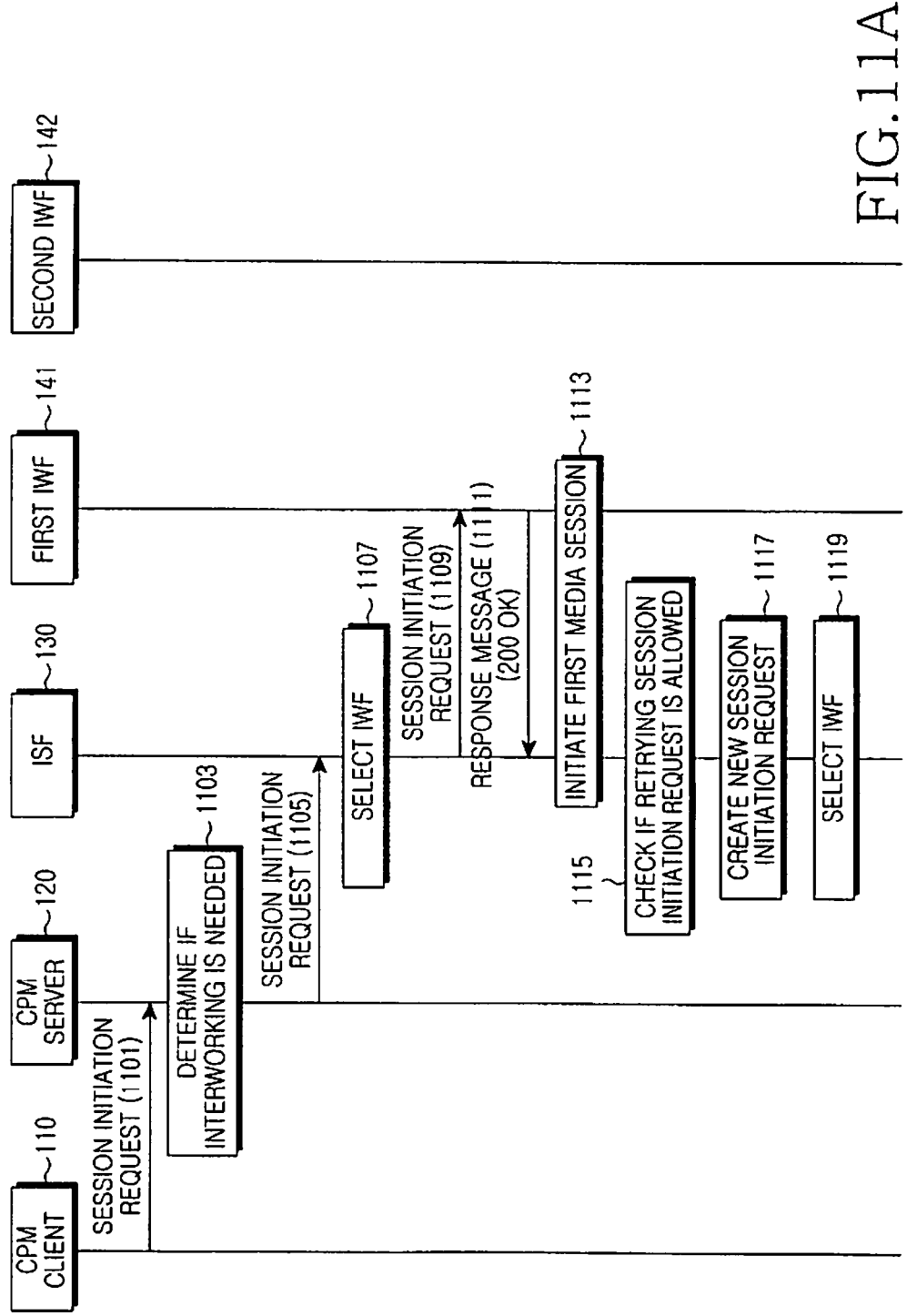
FIGS. 11A and 11B are a message flowchart for explaining an operation of initiating a session in a B2BUA mode of a CPM system in accordance with a fifth embodiment of the present invention.
Figure 11B:
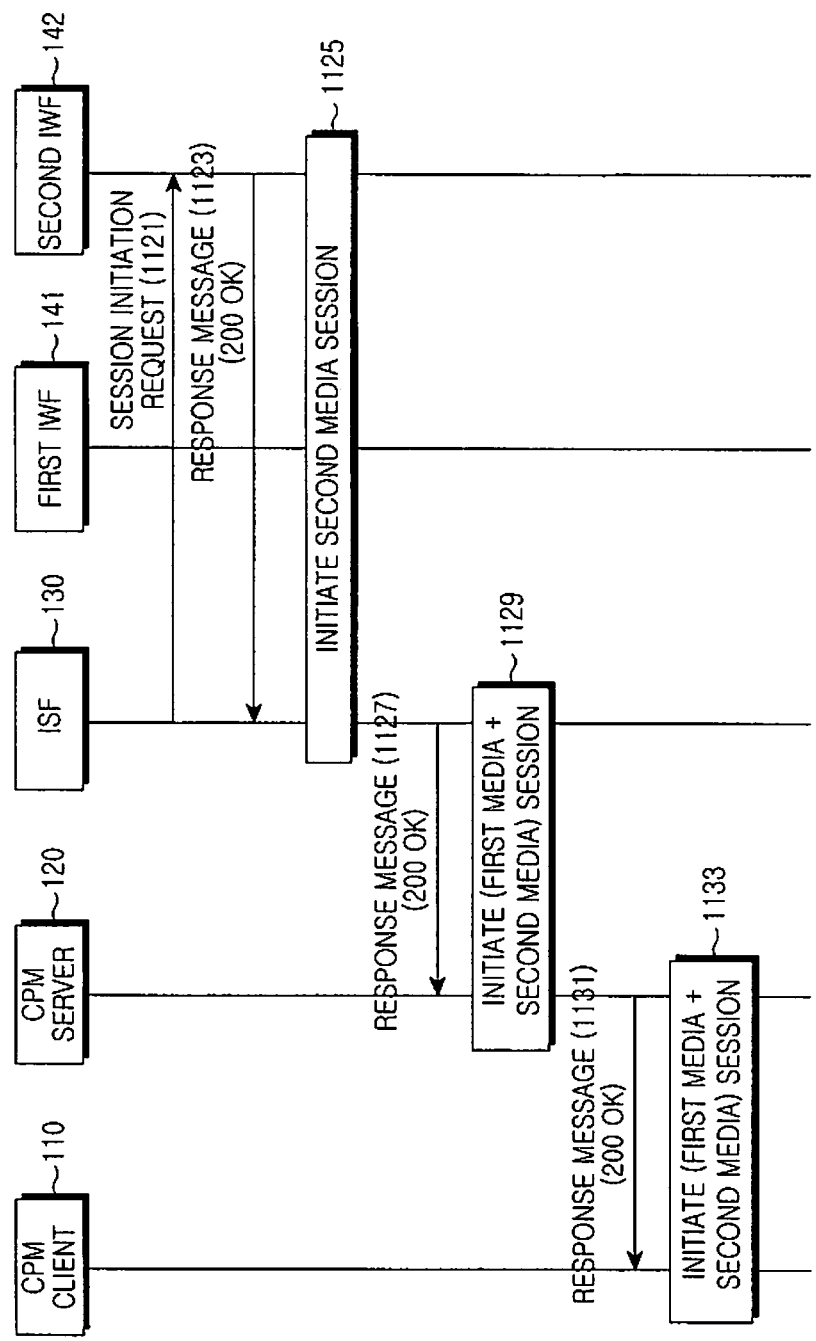

FIGS. 11A and 11B illustrate the operation of initiating a session when an ISF operates in the B2BUA mode according to a fifth embodiment of the present invention.

In step 1101, the CPM client 110 sends a session initiation request message (INVITE) including the first and second media to the CPM server 120. In step 1103, the CPM server 120 determines if interworking is needed for the session initiation. Since it is assumed that the receiving client is a non-CPM client, interworking is needed. Thus, in step 1105, the CPM server 120 sends the session initiation request message to the ISF 130.

In step 1107, the ISF 130 selects an IWF suitable for the session initiation. FIGS. 11A and 11B assume that the first IWF 141 supporting the first media is selected. Thus, in step 1109, the ISF 130 sends a session initiation request message to the first IWF 141. In step 1111, the first IWF 141 sends back an acceptance response message (200 OK) to the session initiation request. Since the first IWF 141 supports the first media, but does not support the second media, the acceptance response message includes details indicating that the second media is rejected due to the attribute of the first IWF 141, that is, the second media is a specific unsupported by the first IWF 141. In step 1113, a media session including the first media is initiated between the ISF 130 and the first IWF 141.

In step 1115, the ISF 130 checks if retrying the session initiation for the rejected second media is allowed. It is assumed here that retrying the session initiation is allowed. Thus, in step 1117, the ISF 130 generates a session initiation request message for the rejected second media. In step 1119, the ISF 130 selects the second IWF 142 as an IWF to which to send the session initiation request message, and then in step 1121, sends the session initiation request message to the selected second IWF 142.

In step 1123, the second IWF 142 sends back an acceptance response message (200 OK). In step 1125, a media session including the second media is then initiated between the ISF 130 and the second IWF 142. In step 1127, the ISF 130 generates a response message to the session initiation request received in step 1105, and sends the response message back to the CPM server 120. The response message includes details indicating that both the first and second media are all accepted. In step 1129, a session including the first and second media is initiated between the CPM server 120 and the ISF 130. In step 1131, the CPM server 120 generates a response message to the session initiation request received in step 1131, and sends the response message back to the CPM client 110. The response message includes details indicating that both the first and second media are all accepted. In step 1133, a session including the first and second media is initiated between the CPM client 110 and the CPM server 120.

Figure 14A:
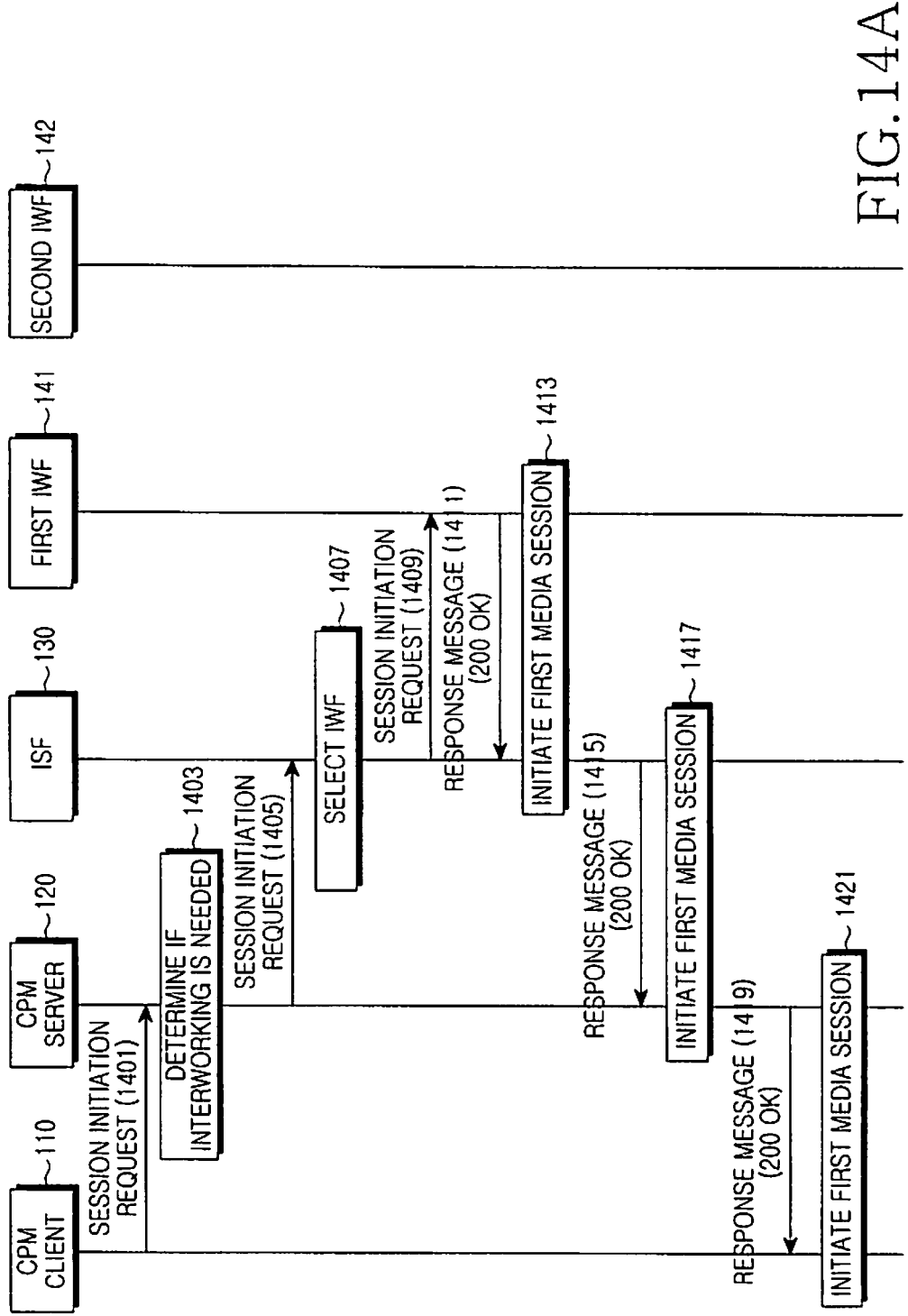
FIGS. 14A and 14B are a message flowchart for explaining another operation of initiating a session when an ISF operates in a B2BUA mode in accordance with the fifth embodiment of the present invention.
Figure 14B:
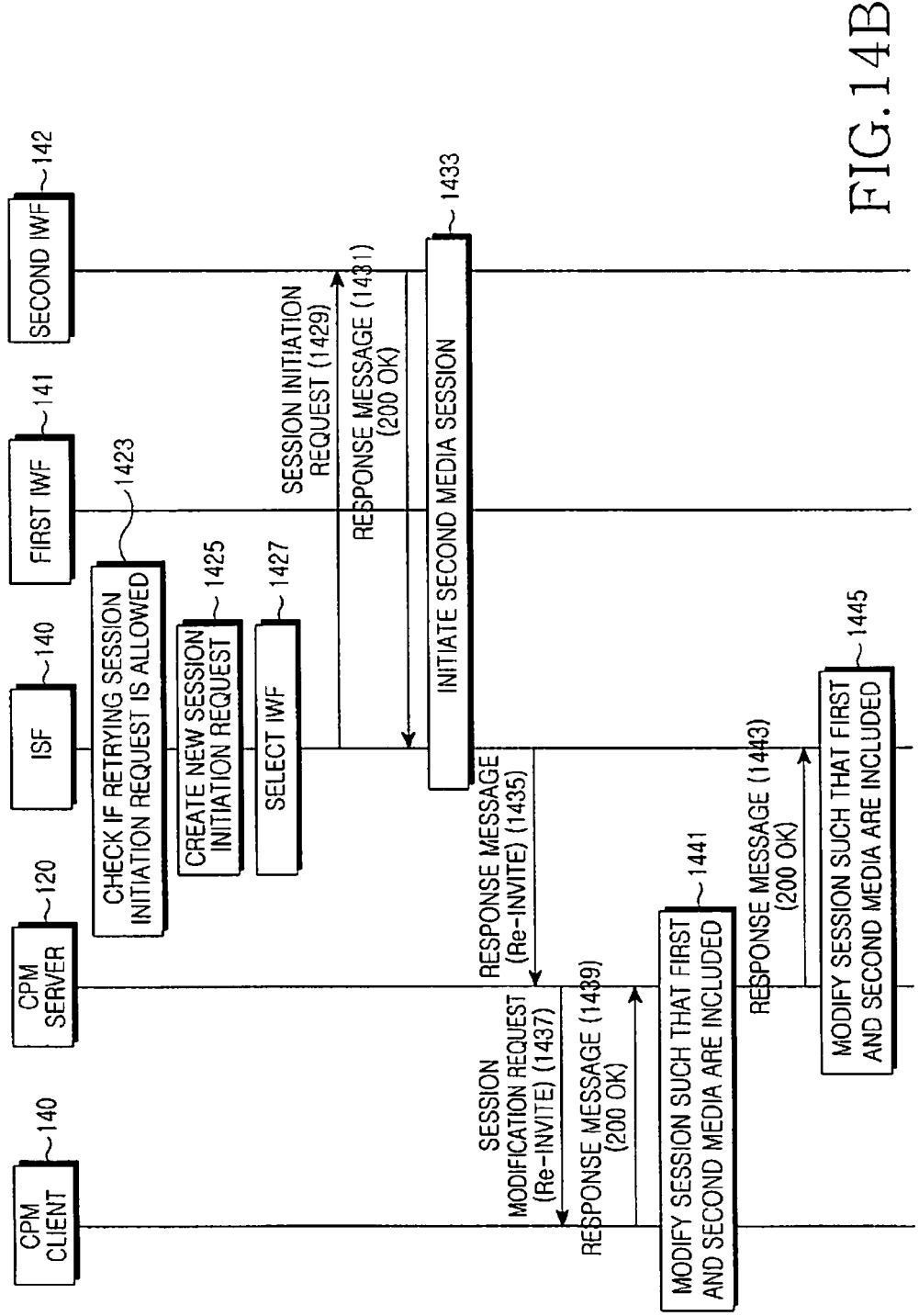

FIGS. 14A and 14B illustrate another operation of initiating a session when an ISF operates in the B2BUA mode according to the fifth embodiment of the present invention. In FIG. 4, the ISF 130 receives all response messages from the respective IWFs, combines them into a single response message, delivers the single response message to the CPM server 120, and then finally initiates a session. To the contrary, in FIGS. 14A and 14B, the ISF 130 first initiates a session with the CPM server 120, based on a response message received from an IWF (a first IWF) that primarily performs interworking. Subsequently, when an acceptance response message is received from an IWF (a second IWF) that secondarily performs interworking, the ISF 130 adds media additionally accepted by the second IWF to the sessions already initiated between the ISF 130 and the CPM server 120, and between the CPM server 120 and the CPM client 110. Therefore, except for these features, the remaining steps in FIG. 14 are the same as those in FIG. 4.

In step 1401, the CPM client 110 sends a session initiation request message (INVITE) including the first and second media to the CPM server 120. In step 1403, the CPM server 120 determines if interworking is needed for the session initiation. Since it is assumed that the receiving client is a non-CPM client, interworking is needed. Thus, in step 1405, the CPM server 120 sends the session initiation request message to the ISF 130.

In step 1407, the ISF 130 selects an IWF that is most suitable to perform the session initiation, based on information including the preference and presence of the receiving client, the media type for which the session initiation request is made, the service to which the receiving client subscribes, the service policy, etc. It is assumed that the ISF 130 selects the first IWF 141 in step 1407.

In step 1409, the ISF 130 sends the session initiation request message to the first IWF 141. In step 1411, the first IWF 141 generates and sends back "200 OK" as an acceptance response message to the session initiation request because it supports the first media. In step 1413, a session for the accepted media is initiated between the ISF 130 and the first IWF 141. In step 1411, the first IWF 141 includes in the response message details indicating that the first media is accepted by the receiving-side user, and the second media is automatically rejected because of unsupported media by the first IWF 141.

In step 1415, the ISF 130 sends the response message to the CPM server 120. In step 1417, the first media session is initiated between the CPM server 120 and the first IWF 141. A point in time when the ISF 130 sends the response message to the CPM server 120 may vary according to the operation mode of the ISF 130. In other words, the ISF 130 may wait for a certain period in time to receive a response message to a new session initiation request to be sent in step 1429, or may send the response message to the CPM server 120 as soon as receiving the first response message from the first IWF 141.

FIGS. 14A and 14B assume the latter. In the case of the former, when the response messages to the new session initiation request are received during a fixed period in time, the ISF 130 integrates these response messages, and then sends the final response message to the CPM server 120, as in the operation of FIGS. 11A and 11B. If the response messages to the new session initiation request are received beyond the fixed period in time, then the ISF 130, first of all, sends the response message received first to the CPM server 120 to initiate a session for the accepted media, and then modifies or maintains the initiated session according to the contents of the subsequent response messages to the new session initiation request.

In step 1419, the CPM server 120 sends the response message to the CPM client 110. In step 1421, the first media session is initiated between the CPM client 110 and the CPM server 120.

In step 1423, the ISF 130 checks if retrying the session initiation request for the second media, automatically rejected by the first IWF 141, is allowed. If allowed, then the ISF 130 generates a new session initiation request for the second media in step 1425, and selects an IWF, which is most suitable to process the new session initiation request, in step 1427. It is assume here that the ISF 130 selects the second IWF 142 supporting the second media. In step 1429, the ISF 130 sends the new session initiation request to the second IWF 142.

In step 1423, the second IWF 142 sends "200 OK" as an acceptance response message to the ISF 130. In step 1433, the second media session is initiated between the ISF 130 and the second IWF 142.

In step 1435, the ISF 130 sends a session modification request to the CPM server 120. The session modification request in step 1435 is a request for adding the second media to the first media session initiated between the CPM server 120 and the IWF 130.

In step 1437, the CPM server 120 sends a session modification request to the CPM client 110. The session modification request in step 1437 is a request for adding the second media to the first media session initiated between the CPM client 110 and the CPM server 120.

In step 1439, the CPM client 110 sends "200 OK" as a response message to the session modification request to the CPM server 120. In step 1441, the session between the CPM client 110 and the CPM server 120 is modified in such a manner as to include the first and second media. Also, in step 1443, the CPM server 120 sends "200 OK" to the ISF 130. Then, in step 1445, the session between the CPM server 120 and the ISF.130 is modified in such a manner as to include the first and second media.

The operation of FIGS. 11A and 11B, in which the ISF processes the session initiation request according to the fifth embodiment of the present invention, is the same as the operation of the CPM server, as described in FIG. 5. However, in the B2BUA mode, the operation of FIG. 5 is performed by the ISF, and thus steps 513 and 509 in FIG. 5 must be revised as follows. That is, step 509 must be revised to "generate a response message to the session initiation request, and send it back to the CPM server", and step 513 must be revised to "select an IWF, which is most suitable to process the session initiation request message generated in step 511, and send the session initiation request message to the selected IWF".

Figure 12A:
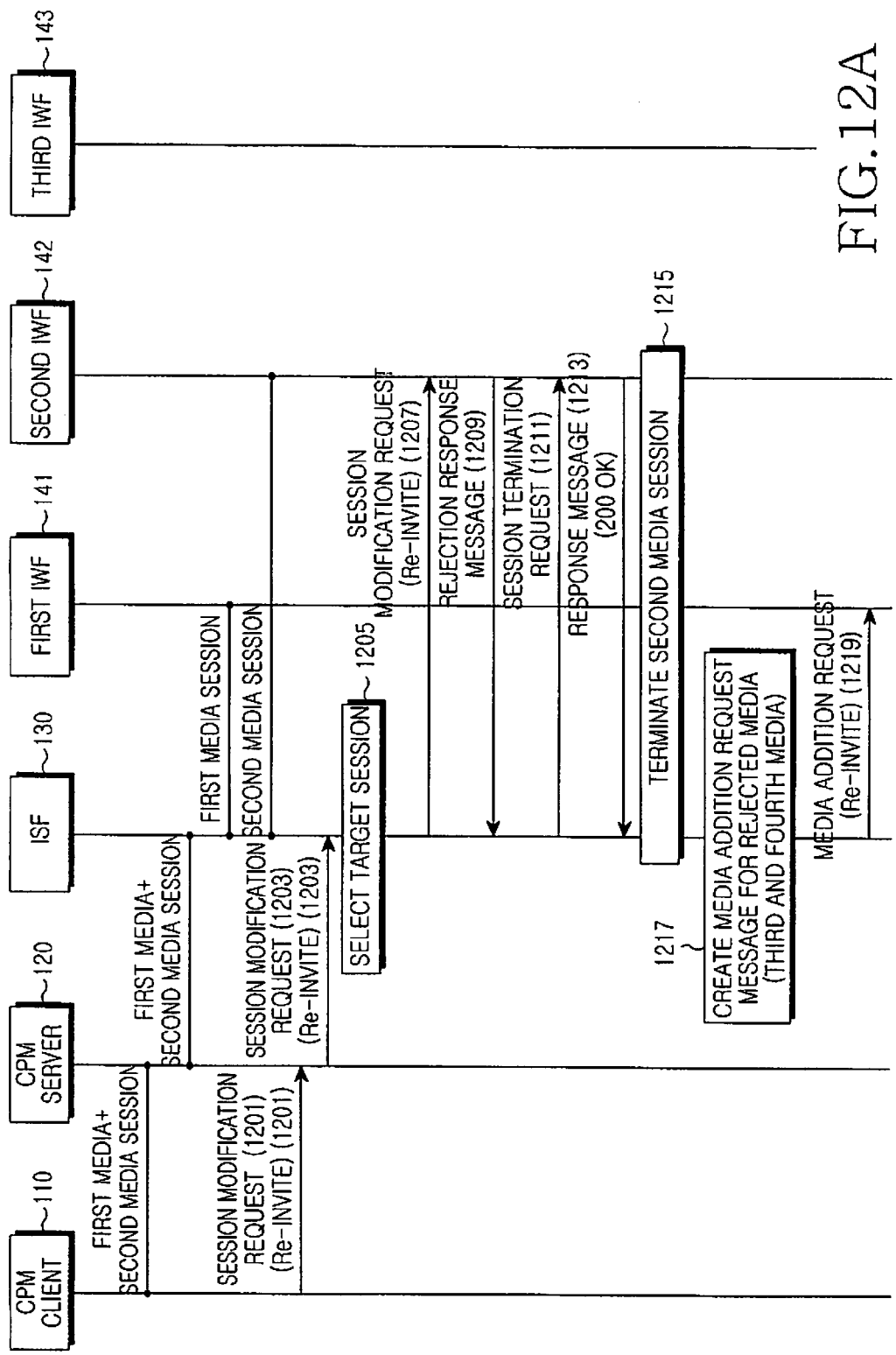
FIGS. 12A and 12B are a message flowchart for explaining an operation of modifying an already initiated session by changing a specific media type in a B2BUA mode in accordance with a sixth embodiment of the present invention.
Figure 12B:
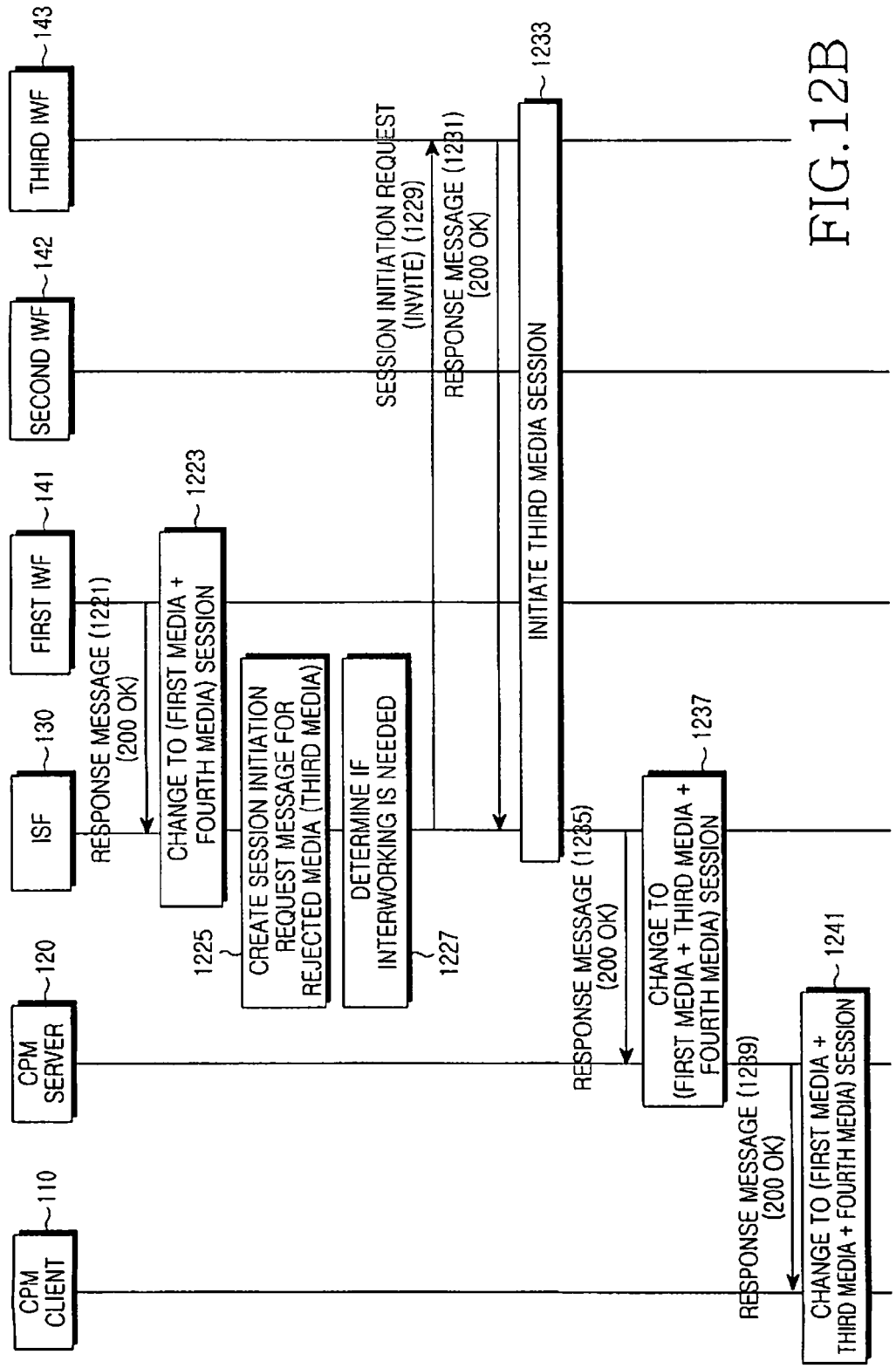

FIGS. 12A and 12B illustrate an operation of modifying an already initiated session by changing a specific media type when an ISF operates in the B2BUA mode according to a sixth embodiment of the present invention. That is, the situation envisioned in FIGS. 12A and 12B supposes that new media, that is, the third and fourth media, are added to the session including the first and second media, which has been already initiated in FIGS. 11A and 11B, and simultaneously the second media is deleted from the session.

In step 1201, the CPM client 110 sends a session modification request message for adding the third and fourth media to the already initiated session and deleting the second media from the session to the CPM server 120. The session modification request message in step 1201 includes SDP parameters for the first, third, and fourth media. In step 1203, the CPM server 120 delivers the received session modification request message to the ISF 130.

In step 1205, the ISF 130 selects the second media session as a target session for the session modification request. In step 1207, the ISF 130 generates a session modification request message adapted to the second media session, and sends the session modification request message to the second IWF 142. The session modification request message in step 1207 includes SDP parameters for the third and fourth media. In step 1209, the second IWF 142 sends back a rejection response message because the second IWF 142 does not support the third and fourth media.

In step 1211, the ISF 130 resend a request for deleting the second media from the second media session to the second IWF 142. Since the second media session does not currently include media other than the second media, the ISF 130 sends a session termination request message (BYE) for the second media session to the second IWF 142.

In step 1213, the second IWF 142 sends back an acceptance response message to the session termination request. In step 1215, the second session between the ISF 130 and the second IWF 142 is terminated.

In step 1217, the ISF 130 generates a media addition request message for adding the rejected third and fourth media to the first media session for which the media addition request is not yet made, and then in step 1219, sends the generated media addition request message to the first IWF 141. The media addition request message includes SDP parameters for first, third, and fourth media.

Since the first and fourth media are supported by the first IWF 141, but the third media is unsupported by the first IWF 141, the first IWF 141 accepts the first and fourth media while rejecting the third media. Thus, in step 1221, the first IWF 141 sends back a response message including such details. That is, the response message includes information indicating that the third media is rejected due to the attribute of the first IWF 141. In step 1223, since the first and fourth media are accepted, the first media session is modified in such a manner as to include the first and fourth media.

In step 1225, the ISF 130 again generates a session initiation request message for the rejected third media. For interworking of the generated session initiation request message, the ISF 130 selects the third IWF 143 in step 1227, and delivers the session initiation request message generated in step 1225 to the third IWF 143. In step 1231, the third IWF 143 generates and sends back an acceptance response message to the session initiation request. In step 1233, the third media session is initiated between the ISF 130 and the third IWF 143.

In step 1235, the ISF 130 generates an acceptance response message to the session modification request received in step 1203, and sends the acceptance response message back to the CPM server 120. The response message in step 1235 includes details indicating that all the CPM server 120 requested is accepted. Subsequently, in step 1237, the session between the CPM server 120 and the ISF 130 is modified in such a manner as to include the first, third, and fourth media.

In step 1239, the CPM server 120 generates an acceptance response message to the session modification request received in step 1201, and sends the acceptance response message back to the CPM client 110. The response message in step 1239 includes details indicating that all the CPM client 110 requested is accepted. In step 1241, the session between the CPM client 1110 and the CPM server 120 is modified in such a manner as to include the first, third, and fourth media.

In the operation of FIGS. 12A and 12B, steps 1207 to 1217 may be revised according to the implementation of the ISF 130. In other words, the ISF 130 may send a media deletion request (Re-INVITE) for the second media or a session termination request (BYE) for the second media session, and simultaneously send a session initiation request (INVITE) for the third and fourth media to an IWF supporting the corresponding media. This is possible because the ISF 130 has already known which media types are supported by each IWF.

Figure 10A:
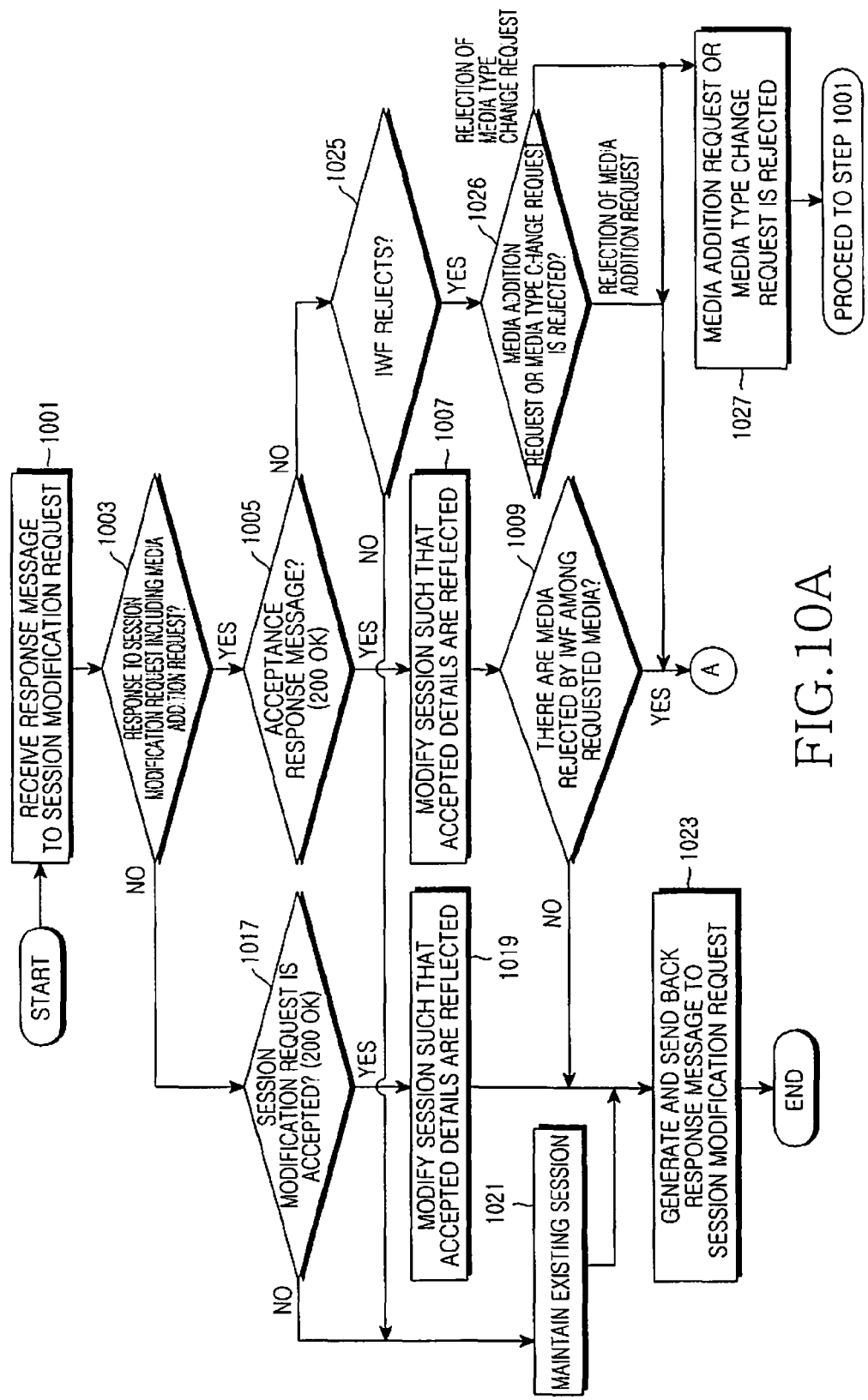
FIGS. 10A and 10B are a flowchart illustrating an operation of a CPM server that receives a response message from an IWF in a proxy mode in accordance with the second to fourth embodiments of the present invention.
Figure 10B:
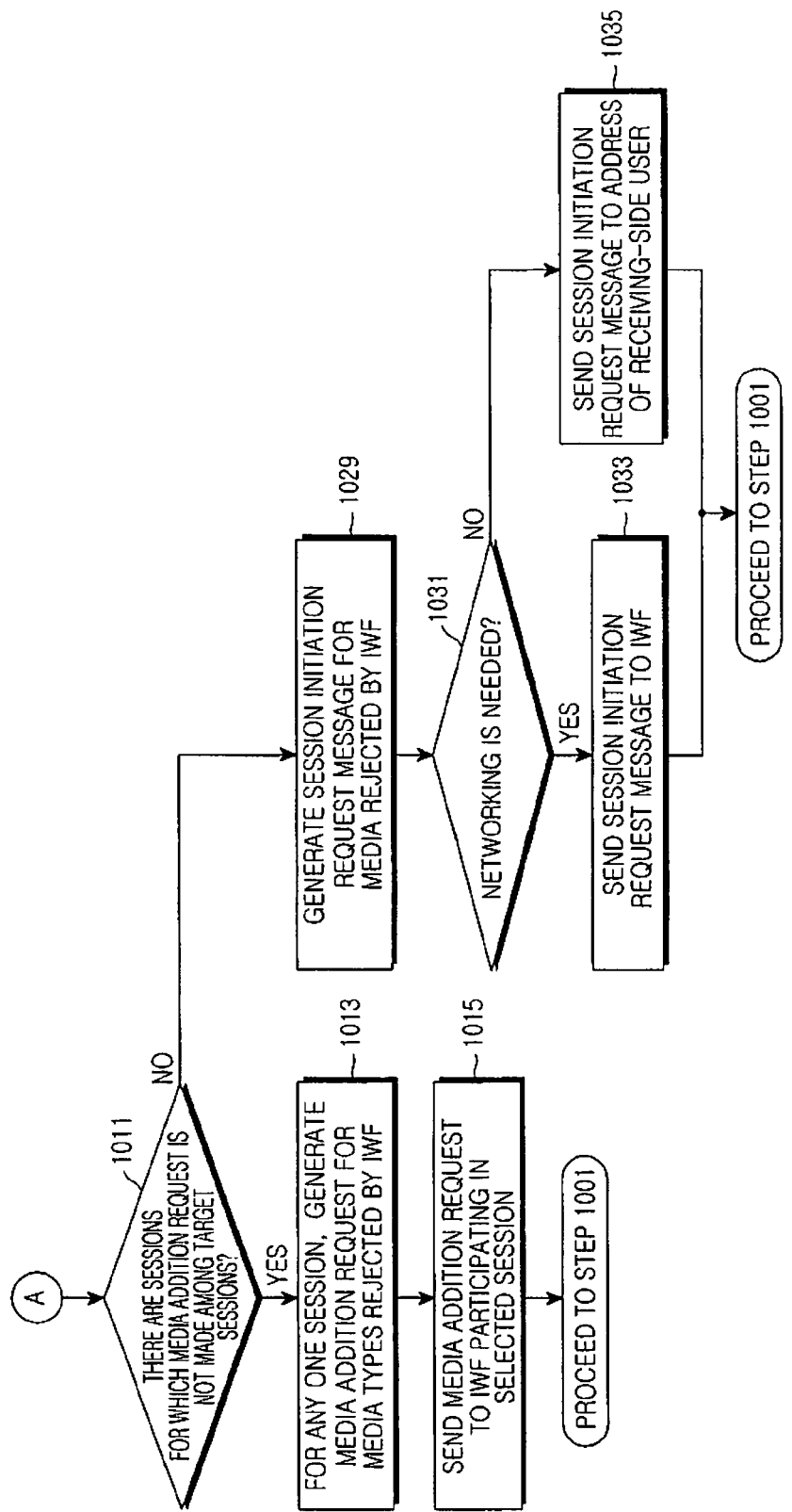

The operation in which the ISF processes the session modification request according to the sixth embodiment of the present invention is the same as the operation of the CPM server, as described in FIGS. 10A and 10B. However, step 1031 is revised as follows. In the case of proxy mode in FIGS. 10A and 10B, the CPM server proceeds to step 1033 or 1035 according to whether interworking is needed, and sends the session initiation request message to the ISF or the address of the receiving client. However, since whether interworking is needed is determined by the CPM server in the B2BUA mode, step 1031 in the B2BUA mode must be revised to "select an IWF, which is most suitable to perform the session initiation request message generated in step 1029, and send the session initiation request message to the selected IWF". Also, unnecessary steps 1033 and 1035 are omitted, and subsequently the ISF returns to step 501 in order to process a response message to the session initiation request message.

As described above, the present invention provides a concrete procedure of not only initiating a session between a sending CPM client and a receiving non-CPM client, but also modifying an already initiated session according to media types or service environments.

In particular, when interworking is needed, a CPM server simultaneously performs interworking of multiple non-CPM services to which a receiving client subscribes, so that a CPM client can exchange various media types by one session, and a non-CPM client can exchange media with the CPM client by using various message services at the same time. Accordingly, users of message services can increase their satisfaction.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A session control method in a Converged Internet Protocol (IP) Messaging (CPM) server for supporting a CPM session between a first client subscribing to a CPM service and a second client not subscribing to the CPM service, the session control method comprising the steps of:

receiving, after the CPM session is initiated between the first and second clients through the CPM server and at least one first Interworking Function (IWF) of a plurality of IWFs is selected, a session modification request message including specific media from the first client, the CPM session including a first session supporting at least one first media;

sending the session modification request message including the specific media to the at least one first IWF through the initiated CPM session; and receiving an acceptance response message from the at least one first IWF, the acceptance response message including information indicating that at least one second media is supported by the at least one first IWF and at least one third media is unsupported by the at least one first IWF;

modifying the first session to include the at least one first media and the at least one second media; and initiating a second session including the at least one third media unsupported by the at least one first IWF with at least one second IWF.

2. The session control method as claimed in claim 1, further comprising, sending a session initiation request message to the at least one second IWF, receiving an acceptance response message from the at least one second IWF, and establishing the second session including the at least one third media with the at least one second IWF.

3. A session control method in an Interworking Function (IWF) for supporting a Converged Internet Protocol (IP) Messaging (CPM) session between a first client subscribing to a CPM service and a second client not subscribing to the CPM service, the session control method comprising the steps of:

receiving, after the CPM session is initiated between the first and second clients through a CPM server and at least one first IWF which is previously selected from a plurality of IWFs, a session modification request message including specific media from the first client through the CPM server, the CPM session including a first session supporting at least one first media, and the specific media including at least one second media and at least one third media; and sending, when the at least one second media is supported by the at least one first IWF and the at least one third media is unsupported by the at least one first IWF, an acceptance response message including information indicating that the at least one second media is supported by the at least one first IWF and the at least one third media is unsupported by the at least one first IWF to the CPM server that modifies the first session to include the at least one first media and the at least one second media and initiates a second session including at least one third media unsupported by the at least one first IWF with at least one second IWF.

4. An interworking apparatus for supporting a Converged Internet Protocol (IP) Messaging (CPM) session between a first client subscribing to a CPM service and a second client not subscribing to the CPM service, the interworking apparatus comprising:

at least one first Interworking Function (IWF) device, selected from a plurality of IWF devices, which supports at least one first media and at least one second media, receives a session modification request message including the at least one second media and at least one third media, generates an acceptance response message including information indicating that the at least one second media is supported by the at least one first IWF device and the at least one third media is unsupported by the at least one first IWF device, and sends the acceptance response message to a CPM server; and an Interworking Selection Function (ISF) device which receives a session modification request message including the specific media from the first client through the CPM server after the CPM session including a first session supporting at least one first media is initiated between the first and second clients through the CPM server and the at least one first IWF device, selects the at least one first IWF device from among the plurality of IWF devices, sends the session modification request message to the at least one first IWF device, receives the acceptance response message from the at least one first IWF device, modifies the first session to include the at least one first media and the at least one second media, and initiates a second session including the at least one third media unsupported by the at least one first IWF device with at least one second IWF device.

5. The interworking apparatus as claimed in claim 4, further comprising a controller which instructs the ISF device to reselect the at least one second IWF device, send a session initiation request message to the at least one second IWF device, receive an acceptance response message from the at least one second IWF device, and establish the second session including the at least one third media with the at least one second IWF device.

6. A session control method in a Converged Internet Protocol (IP) Messaging (CPM) server for supporting a CPM session between a first client subscribing to a CPM service and a second client not subscribing to the CPM service, the session control method comprising the steps of:

receiving a session initiation message including specific media from the first client;

initiating a first session by sending the session initiation message including the specific media to at least one first Interworking Function (IWF) selected from a plurality of IWFs through an Interworking Selection Function (ISF), receiving an acceptance response message from the at least one first IWF through the ISF, the acceptance response message including information indicating that at least one first media is supported by the at least one first IWF and at least one second media is unsupported by the at least one first IWF, and establishing the first session including the at least one first media with the at least one first IWF; and initiating a second session including the at least one second media unsupported by the at least one first IWF with at least one second IWF.

7. A session control method in an Interworking Function (IWF) for supporting a Converged Internet Protocol (IP) Messaging (CPM) session between a first client subscribing to a CPM service and a second client not subscribing to the CPM service, the session control method comprising the steps of:

receiving a session initiation message including at least one specific media from the first client through a CPM server, the at least one specific media including at least one first media and at least one second media; and sending, when the at least one first media is supported by at least one first IWF and the at least one second media is unsupported by the at least one first IWF, which is previously selected from a plurality of IWFs, an acceptance response message to the CPM server, the acceptance response message including information indicating that the at least one first media is supported by the at least one first IWF and the at least one second media is unsupported by the at least one first IWF, and establishing a first session including the at least one first media with the CPM server, wherein the CPM server initiates a second session including at least one second media unsupported by the at least one first IWF with at least one second IWF.

8. An interworking apparatus for supporting a Converged Internet Protocol (IP) Messaging (CPM) session between a first client subscribing to a CPM service and a second client not subscribing to the CPM service, the interworking apparatus comprising:
- at least one first Interworking Function (IWF) device, selected from a plurality of IWF devices, which supports at least one first media, receives a session initiation message including the at least one first media and at least one second media, generates an acceptance response message including information indicating that the at least one first media is supported by the at least one first IWF device and the at least one second media is unsupported by the at least one first IWF device, sends the acceptance response message to a CPM server, and establishes a first session including the at least one first media with the CPM server; and
- an Interworking Selection Function (ISF) device which receives a session initiation request message including the specific media from the first client through the CPM server, at least one specific media including at least one first media and at least one second media, selects the at least one first IWF device from among the plurality of IWF devices, sending the session initiation request message to the at least one first IWF device, receives the acceptance response message from the at least one first IWF device, establishes the first session including the at least one first media with the at least one first IWF device, and initiates a second session including the at least one second media unsupported by the at least one first IWF device with at least one second IWF device.

9. The interworking apparatus as claimed in claim 8, further comprising a controller which instructs the ISF device to reselect the at least one second IWF device, send a session initiation request message to the at least one second IWF device, receive an acceptance response message from the at least one second IWF device, and establish the second session including the at least one second media with the at least one second IWF device.

10. The interworking apparatus as claimed in claim 9, wherein the ISF device sends the session initiation request message to the at least one second IWF device.

* * * * *